United States Patent
Zhou et al.

(10) Patent No.: US 9,401,561 B2
(45) Date of Patent: Jul. 26, 2016

(54) METHODS AND APPARATUS FOR TERMINATING WIRE WOUND ELECTRONIC COMPONENTS TO A HEADER ASSEMBLY

(71) Applicant: Pulse Electronics, Inc., San Diego, CA (US)

(72) Inventors: Hengshan Zhou, San Diego, CA (US); Yonggang Wang, San Diego, CA (US)

(73) Assignee: Pulse Electronics, Inc., San Diego, CA (US)

( * ) Notice: Subject to any disclaimer, the term of this patent is extended or adjusted under 35 U.S.C. 154(b) by 30 days.

(21) Appl. No.: 14/203,374

(22) Filed: Mar. 10, 2014

(65) Prior Publication Data

US 2015/0011131 A1    Jan. 8, 2015

Related U.S. Application Data

(63) Continuation-in-part of application No. 14/073,762, filed on Nov. 6, 2013.

(60) Provisional application No. 61/842,299, filed on Jul. 2, 2013.

(51) Int. Cl.
*H01R 13/66* (2006.01)
*H01R 13/518* (2006.01)
*H01R 13/6464* (2011.01)
(Continued)

(52) U.S. Cl.
CPC .......... *H01R 13/518* (2013.01); *H01R 13/6464* (2013.01); *H01R 13/7193* (2013.01); *H04Q 1/02* (2013.01); *H01R 13/6633* (2013.01); *H01R 24/64* (2013.01)

(58) Field of Classification Search
CPC ............. H01R 13/719; H01R 13/7193; H01R 13/646; H01R 13/6633; H01R 24/64; H01R 13/518
USPC ............. 439/620.21, 620.05, 620.06, 620.07, 439/620.22, 620.23
See application file for complete search history.

(56) References Cited

U.S. PATENT DOCUMENTS 4,125,216 A * 11/1978 Ozimec .......................... 228/4.5
5,015,981 A    5/1991 Lint et al.
(Continued)

OTHER PUBLICATIONS

International Search Report and Written Opinion for Application No. PCT/US2014/045315, mailed on Nov. 7, 2014, 8 Pages.

*Primary Examiner* — Neil Abrams
*Assistant Examiner* — Travis Chambers
(74) *Attorney, Agent, or Firm* — Gazdzinski & Associates, PC

(57) ABSTRACT

An exemplary header insert assembly, and methods of manufacture and use thereof. In one embodiment, the header insert assembly comprises a connector insert assembly having an insert body assembly consisting of an insert body element. The insert body element includes an electronic component receiving cavity that is configured to receive any number of electronic components. The insert body assembly also includes a wire termination feature that includes termination slots that position the wire ends of the wire wound electronic components adjacent to a substrate to which the wire ends are ultimately to be secured. The wire ends are then secured to the substrate using, for example, a mass termination technique. The aforementioned header insert assembly can then be optionally inserted into a single or multi-port connector assembly. Methods of manufacturing the aforementioned single or multi-port connector assemblies are also disclosed.

19 Claims, 28 Drawing Sheets

(51) Int. Cl.
*H01R 13/7193* (2011.01)
*H04Q 1/02* (2006.01)
*H01R 24/64* (2011.01)

(56) References Cited

U.S. PATENT DOCUMENTS

| | | | |
|---|---|---|---|
| 5,307,041 A * | 4/1994 | Kato | 336/83 |
| 5,496,195 A | 3/1996 | Reed | |
| 5,587,884 A | 12/1996 | Raman | |
| 5,656,985 A * | 8/1997 | Lu | 336/96 |
| 5,986,894 A | 11/1999 | Lint et al. | |
| 6,005,463 A | 12/1999 | Lint et al. | |
| 6,149,050 A * | 11/2000 | Lai | 228/180.1 |
| 6,297,721 B1 * | 10/2001 | Lu | 336/96 |
| 6,319,064 B1 | 11/2001 | Belopolsky et al. | |
| 6,395,983 B1 | 5/2002 | Gutierrez | |
| 6,585,540 B2 | 7/2003 | Doyle, III et al. | |
| 6,593,840 B2 | 7/2003 | Morrison et al. | |
| 6,729,906 B1 * | 5/2004 | Simmons et al. | 439/607.26 |
| 6,811,442 B1 | 11/2004 | Lien et al. | |
| 6,962,511 B2 | 11/2005 | Gutierrez et al. | |
| 6,986,684 B1 * | 1/2006 | Lien | 439/620.07 |
| 7,241,181 B2 | 7/2007 | Machado et al. | |
| 7,314,387 B1 * | 1/2008 | Liu | 439/620.11 |
| 7,367,851 B2 | 5/2008 | Machado et al. | |
| 8,206,183 B2 | 6/2012 | Machado et al. | |
| 8,535,100 B2 * | 9/2013 | Ge | 439/620.17 |
| 8,591,262 B2 | 11/2013 | Schaffer et al. | |
| 8,911,257 B2 | 12/2014 | Kang et al. | |
| 2003/0186586 A1 * | 10/2003 | Gutierrez et al. | 439/607 |
| 2006/0009061 A1 | 1/2006 | Machado et al. | |
| 2012/0154087 A1 * | 6/2012 | Chen | 336/90 |
| 2013/0288526 A1 | 10/2013 | Rascon et al. | |
| 2014/0154920 A1 | 6/2014 | Dinh et al. | |
| 2014/0349525 A1 | 11/2014 | Gutierrez et al. | |
| 2015/0011126 A1 | 1/2015 | Zhou et al. | |

\* cited by examiner

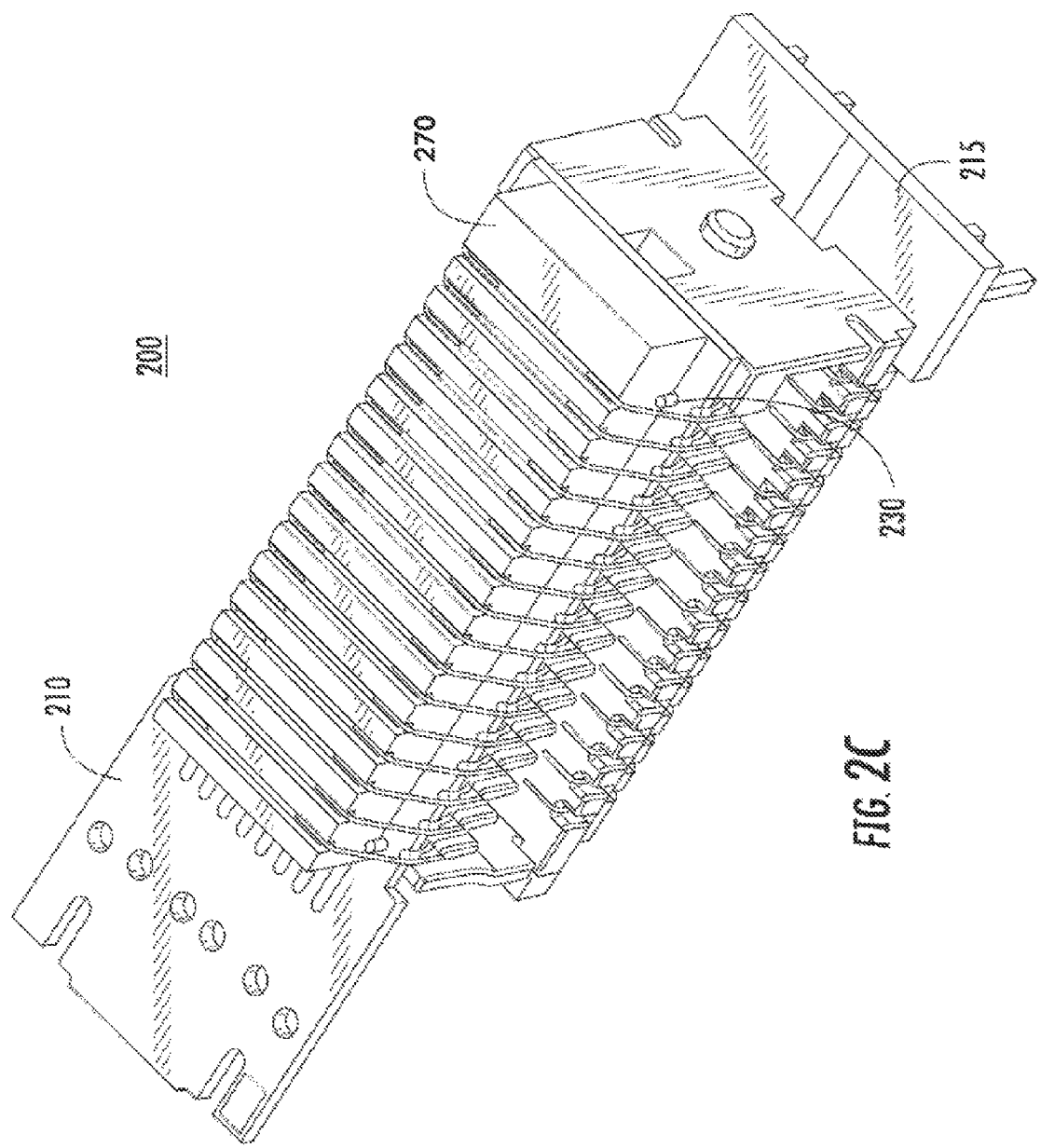

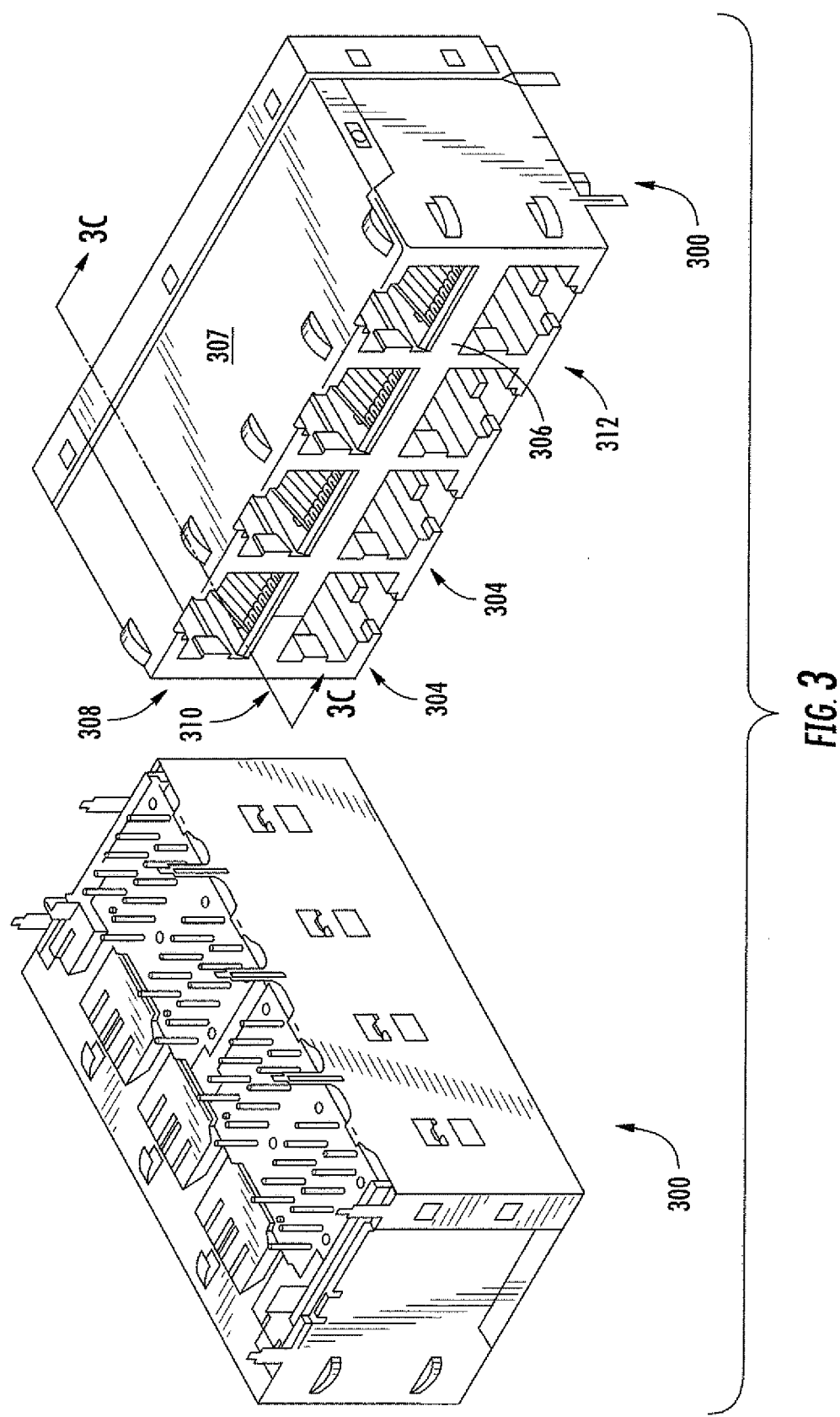

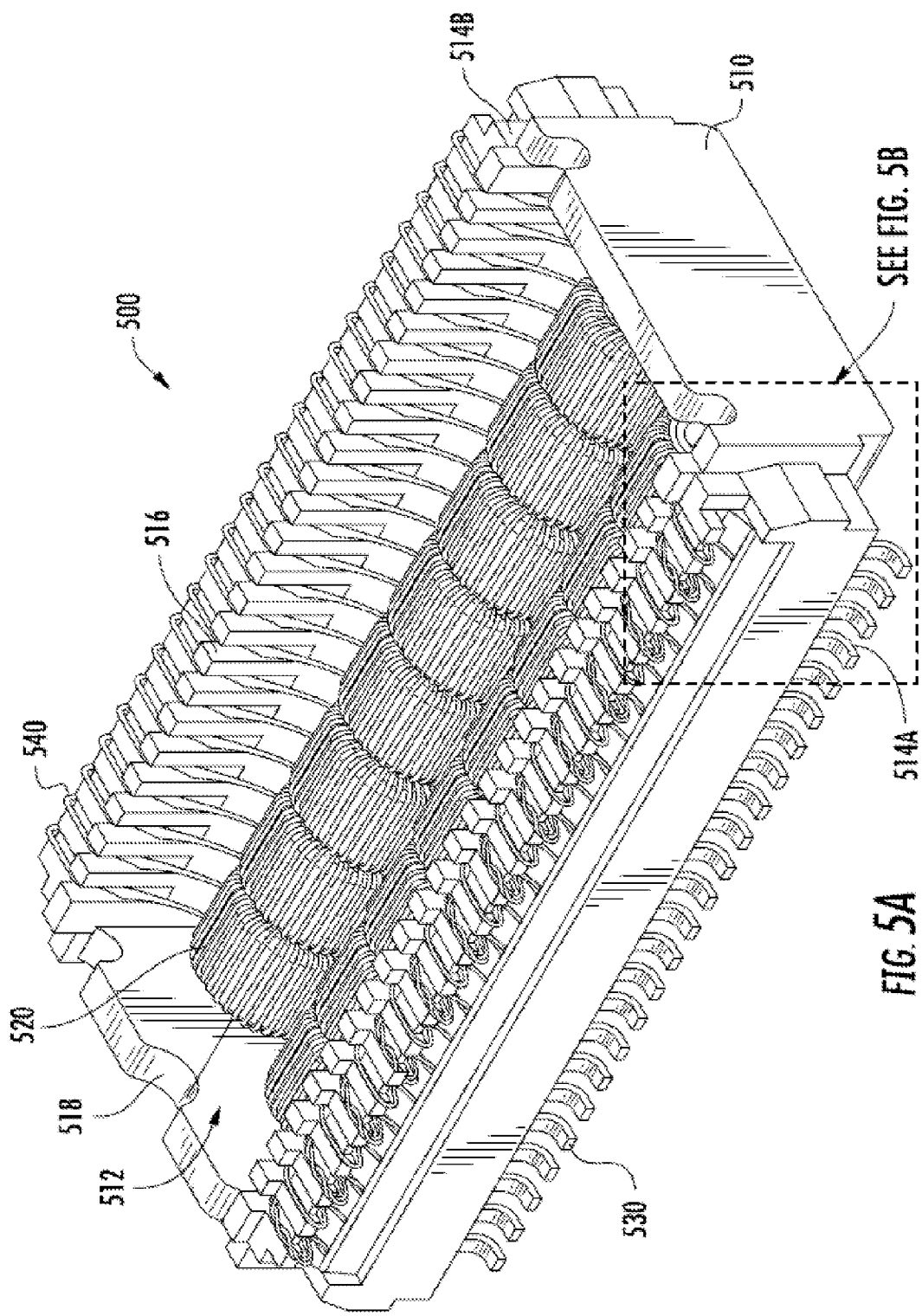

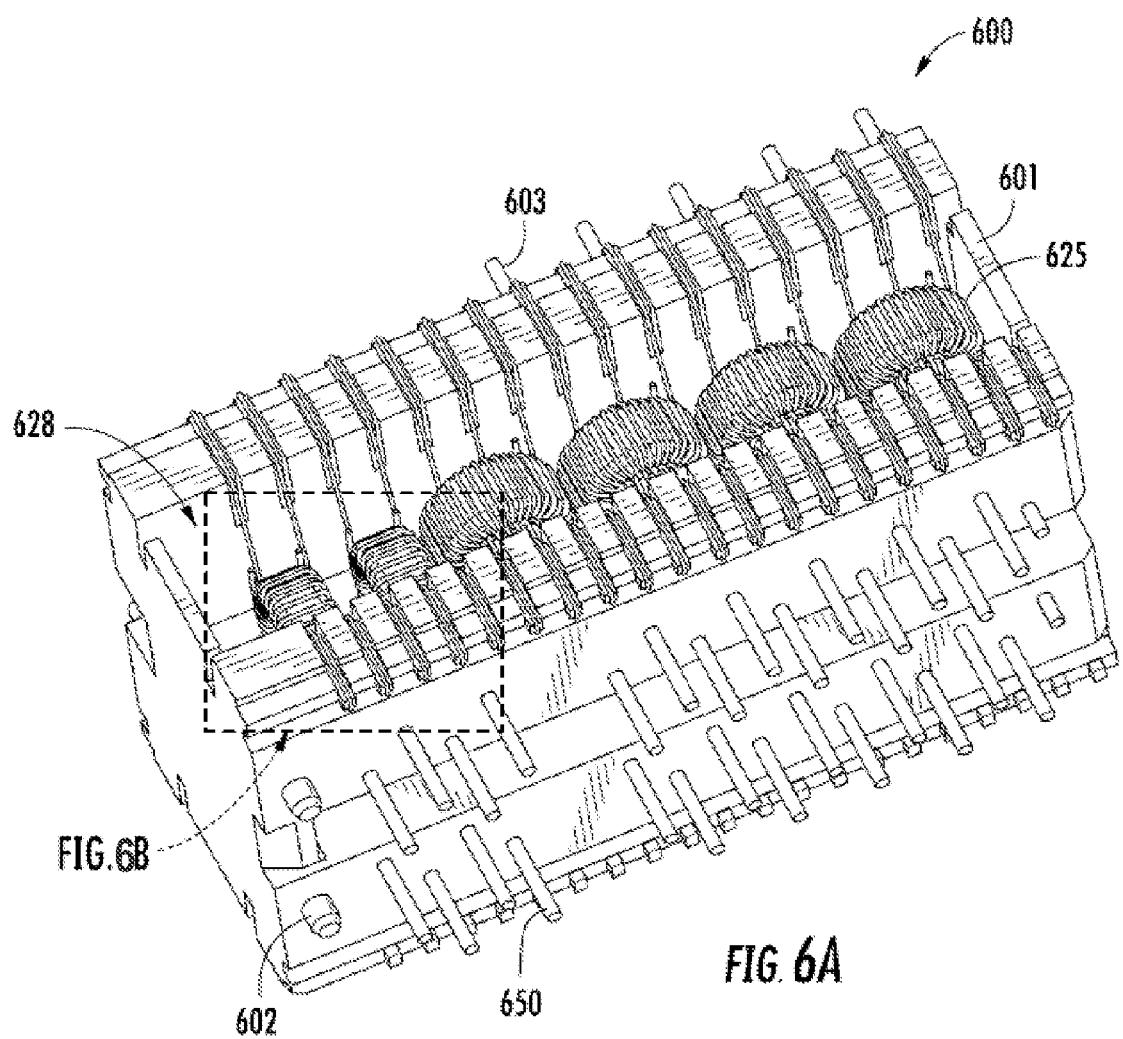

METHODS AND APPARATUS FOR TERMINATING WIRE WOUND ELECTRONIC COMPONENTS TO A HEADER ASSEMBLY

PRIORITY

This application is a continuation-in-part of co-owned U.S. patent application Ser. No. 14/073,762 entitled "Methods and Apparatus for Terminating Wire Wound Electronic Components to an Insert Header Assembly" filed Nov. 6, 2013, which claims the benefit of priority to U.S. Provisional Patent Application Ser. No. 61/842,299 entitled "Open Header Electronics Apparatus and Methods of Manufacturing and Using the Same" filed Jul. 2, 2013, the contents of each of the foregoing being incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNOLOGICAL FIELD

The present disclosure relates generally to circuit elements and more particularly in one exemplary aspect to electronic packaging for these circuit elements and methods of utilizing and manufacturing the same.

DESCRIPTION OF RELATED TECHNOLOGY

Modular connectors are commonly used in the telecommunications industry for Ethernet applications and telephone jacks among others. Originally, modular connectors were used with registered jack (RJ) systems. The connectors are typically of female gender and usually called sockets. The male connectors are typically called plugs. The modular connectors (and plugs) adhere to TIA/EIA-568-B standardization and in addition to electrical connection may be performing signal conditioning functions such as voltage transformation and electrical noise filtering.

Some of the considerations for effective manufacturing include (i) cost as a function of scalable and automated manufacturing capability (ii) compliance with TIA/EIA-568-B standards; (iii) footprint of the connectors and plugs; (iv) electrical conductivity and noise performance characteristics; (v) reliability of the connectors; (vi) ability to configure the connector for plurality of industry operations such as IP networking and conducted telecommunications (vii) simplified manufacturing methods providing for highly effective and automated manufacturing.

The aforementioned factors have resulted in myriad different (and often highly specialized) configurations for modular connectors in the prior art. Many of these designs utilize an internal PCB or substrate for carrying electronic or signal conditioning components internal to the connector housing. For example, U.S. Pat. No. 7,241,181 to Machado et al. and entitled "Universal Connector Assembly and Method of Manufacturing", incorporated herein by reference in its entirety, discloses, in one exemplary embodiment, insert assemblies for use within an electrical connector. These insert assemblies include a cavity that house choke coils and transformers. The wires from these choke coils and transformers are then in one variant wire wrapped and soldered to terminals present on the insert assembly in order to facilitate the signal conditioning function of these choke coils and transformers within the electrical connector. However, each of the transformers and choke coils present within this electrical connector has three (3) to four (4) windings with upwards of six hundred and ninety six (696) wire terminations, which may have to be manually wrapped around terminals and soldered (which can be a very time consuming process contributing greatly to the overall cost of the connector assembly).

Accordingly, it would be desirable to provide, inter alia, an improved electrical connector (e.g., modular jack) design that would provide reliable and superior electrical and noise performance, while allowing for low cost manufacturing. Ideally, such a solution would eliminate the need to manually wrap and hand solder these windings to these terminations, in order to avoid the lengthy time and associated cost of these highly manual manufacturing processes. Moreover, such a solution would have applicability beyond just electrical connectors and could be utilized in, for example, other leaded header configurations. Furthermore, such a solution would also improve the reliability of the soldered terminations, thereby avoiding costly rework manufacturing processes.

SUMMARY

The present disclosure satisfies the foregoing needs by providing, inter alia, an improved electrical header assembly which is produced via manufacturing techniques at a substantially lower cost than is present in the prior art.

In one aspect, a multi-port connector assembly is disclosed.

In a second aspect, a single port connector assembly is disclosed.

In a third aspect, connector insert assemblies useful for the aforementioned single and multi-port connector assemblies are disclosed.

In a fourth aspect, methods of manufacturing the aforementioned single and multi-port connector assemblies are disclosed.

In a fifth aspect, methods of manufacturing the aforementioned connector insert assemblies for the single or multi-port connector assemblies are disclosed.

In a sixth aspect, a header assembly suitable for mounting onto the surface of a printed circuit board is disclosed.

In a seventh aspect, a method of manufacturing the aforementioned header assembly is disclosed.

In an eighth aspect, an open header electronics apparatus having one or more inductive devices housed within the open header electronics apparatus is disclosed.

In a ninth aspect, an open header electronics apparatus with sidewalls having terminal pin channels formed in a top portion of the sidewall is disclosed.

In a tenth aspect, an open header electronics apparatus with sidewalls having channels formed within a side portion of the sidewalls is disclosed.

In an eleventh aspect, an open header electronics apparatus with sidewalls having a conduit running longitudinally down an axis of the sidewall is disclosed.

In a twelfth aspect, an open header electronics apparatus that is encapsulated or filled with an encapsulant such as a thermoset epoxy resin, silica fillers, or other suitable filler materials or constituents is disclosed.

In a thirteenth aspect, methods of manufacturing the aforementioned open header electronic apparatus are disclosed.

Various objects, features, aspects and advantages of the inventive subject matter will become more apparent from the following detailed description of preferred embodiments, along with the accompanying drawings.

BRIEF DESCRIPTION OF THE DRAWINGS

The features, objectives, and advantages of the disclosure will become more apparent from the detailed description set forth below when taken in conjunction with the drawings, wherein:

FIG. 2C is a perspective view of a second embodiment of a connector insert assembly in combination with a solder cover, according to the principles of the present disclosure.

FIG. 3 shows front and back perspective views of a first exemplary embodiment (shielded 2×4, for Gigabit Ethernet or GBE) of the connector assembly according to the present disclosure.

FIG. 5A is a perspective view of a second exemplary open header electronics apparatus having one or more inductive devices positioned therein in accordance with the principles of the present disclosure.

FIG. 6A is a perspective view of third exemplary embodiment of a connector insert assembly according to the principles of the present disclosure.

DETAILED DESCRIPTION

Figure 1:
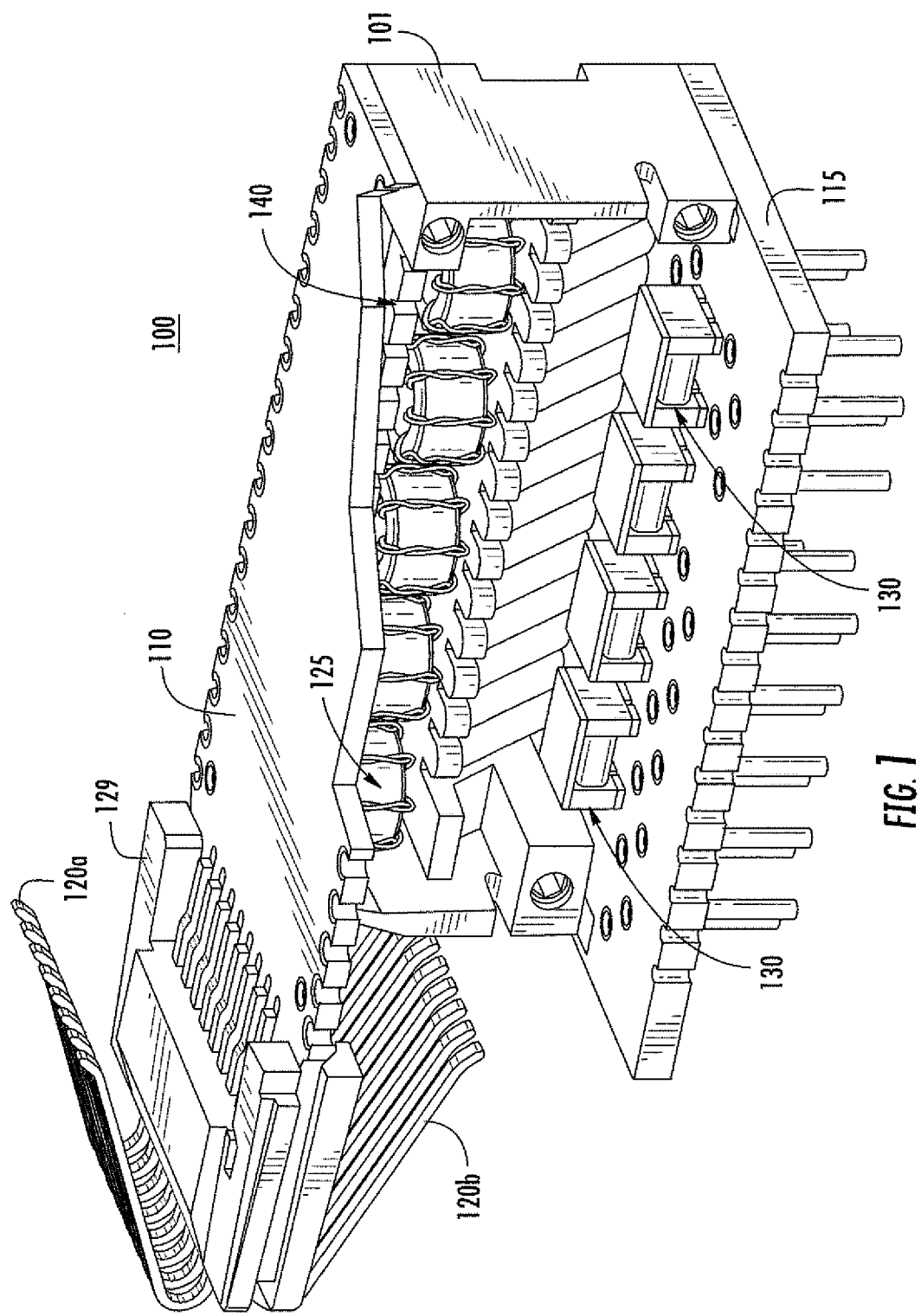
FIG. 1 is a perspective view of a first exemplary embodiment of a connector insert assembly according to the principles of the present disclosure.

Reference is now made to the drawings wherein like numerals refer to like parts throughout.

It is noted that while the following description is cast primarily in terms of a plurality of RJ-type connectors and associated modular plugs of the type well known in the art, the present invention may be used in conjunction with any number of different connector types. Accordingly, the following discussion of the RJ connectors and plugs is merely exemplary of the broader concepts.

As used herein, the terms "electrical component" and "electronic component" are used interchangeably and refer to components adapted to provide some electrical and/or signal conditioning function, including without limitation inductive reactors ("choke coils"), transformers, filters, transistors, gapped core toroids, inductors (coupled or otherwise), capacitors, resistors, operational amplifiers, and diodes, whether discrete components or integrated circuits, whether alone or in combination.

As used herein, the term "interlock base" refers generally to, without limitation, a structure such as that disclosed in U.S. Pat. No. 5,015,981 to Lint, et al. issued May 14, 1991 entitled "Electronic microminiature packaging and method", U.S. Pat. No. 5,986,894 to Lint, et al. issued Nov. 16, 1999 entitled "Microelectronic component carrier and method of its manufacture", U.S. Pat. No. 6,005,463 to Lint, et al. issued Dec. 21, 1999 entitled "Through-hole interconnect device with isolated wire-leads and component barriers", U.S. Pat. No. 6,395,983 to Gutierrez issued May 28, 2002 entitled "Electronic packaging device and method", or U.S. Pat. No. 6,593,840 to Morrison, et al. issued Jul. 15, 2003 entitled "Electronic packaging device with insertable leads and method of manufacturing", each of the foregoing incorporated herein by reference in its entirety.

As used herein, the term "magnetically permeable" refers to any number of materials commonly used for forming inductive cores or similar components, including without limitation various formulations made from ferrite.

As used herein, the term "port pair" refers to an upper and lower modular connector (port) which are in a substantially over-under arrangement; i.e., one port disposed substantially atop the other port, whether directly or offset in a given direction.

As used herein, the term "signal conditioning" or "conditioning" shall be understood to include, but not be limited to, signal voltage transformation, filtering, current limiting, sampling, processing, and time delay.

As used herein, the terms "top", "bottom", "side", "up", "down" and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

Overview

The present disclosure provides, inter alia, exemplary configurations of a connector insert assembly. In one embodiment, the connector insert assembly comprises an insert body assembly consisting of one or more insert body elements made from a high-temperature polymer. The insert body assembly includes an electronic component receiving cavity that is configured to receive any number of electronic components, including without limitation, chip chokes and wire wound electronic components.

The insert body assembly includes a wire termination feature that includes termination slots (and optionally a conductive terminal within the termination slot) that position the wire ends of the wire wound electronic components adjacent to a substrate to which the wire ends are ultimately to be secured. In one embodiment, the termination slots are disposed immediately adjacent the aforementioned substrate such that the substrate positions and secures the wire ends. The wire ends are then secured to the substrate using, for example, a mass termination technique. Alternatively, a separate component is disposed adjacent the substrate and holds the wire ends of the wire wound electronic components so that the wire ends can be positioned and secured to the adjacent substrate. This separate component can then be removed and subsequently reused during subsequent manufacturing operations.

The aforementioned connector insert assembly can then be inserted into a single or multi-port connector assembly. Methods of manufacturing the aforementioned connector insert assemblies and single or multi-port connector assemblies are also disclosed.

The present disclosure also provides, inter alia, improved low cost and highly consistent open header assemblies and methods for manufacturing, and utilizing, the same.

More specifically, the present disclosure addresses connectivity issues between the so-called wire leads coming off of a wound transformer core and the terminal pins of a surface mount carrier package.

In one embodiment, a header assembly having sidewalls with wire routing channels formed within a top portion of the sidewalls is disclosed. The header assembly also includes mounting channels within a side portion of the sidewalls in order to secure the wire ends of the wound transformer cores prior to being terminated to the terminals of the header assembly. The wire leads are electrically coupled to the terminal pins via a eutectic solder using well known soldering techniques such as hand soldering, solder dipping, resistance welding, etc. without necessitating the need to wire wrap the terminals.

Methods of manufacturing and using the aforementioned header assembly are also disclosed.

Exemplary Embodiments

Detailed descriptions of the various embodiments and variants of the apparatus and methods of the present disclosure are now provided. While primarily discussed in the context of inductive devices used in networking applications, the various apparatus and methodologies discussed herein are not so limited. In fact, many of the apparatus and methodologies described herein are useful in the manufacture of any number of electronic or signal conditioning components that can benefit from the wire termination methods described herein, which may also be useful in different applications and/or provide different signal conditioning functions.

In addition, it is further appreciated that certain features discussed with respect to specific embodiments can, in many instances, be readily adapted for use in one or more other contemplated embodiments that are described herein. It can be readily recognized by one of ordinary skill, given the present disclosure, that many of the features described herein possess broader usefulness outside of the specific examples and implementations with which they are described, and in fact many features shown with respect to one embodiment can be combined with or used in place of those associated with other embodiments.

Connector Insert Assembly

Figure 1A:
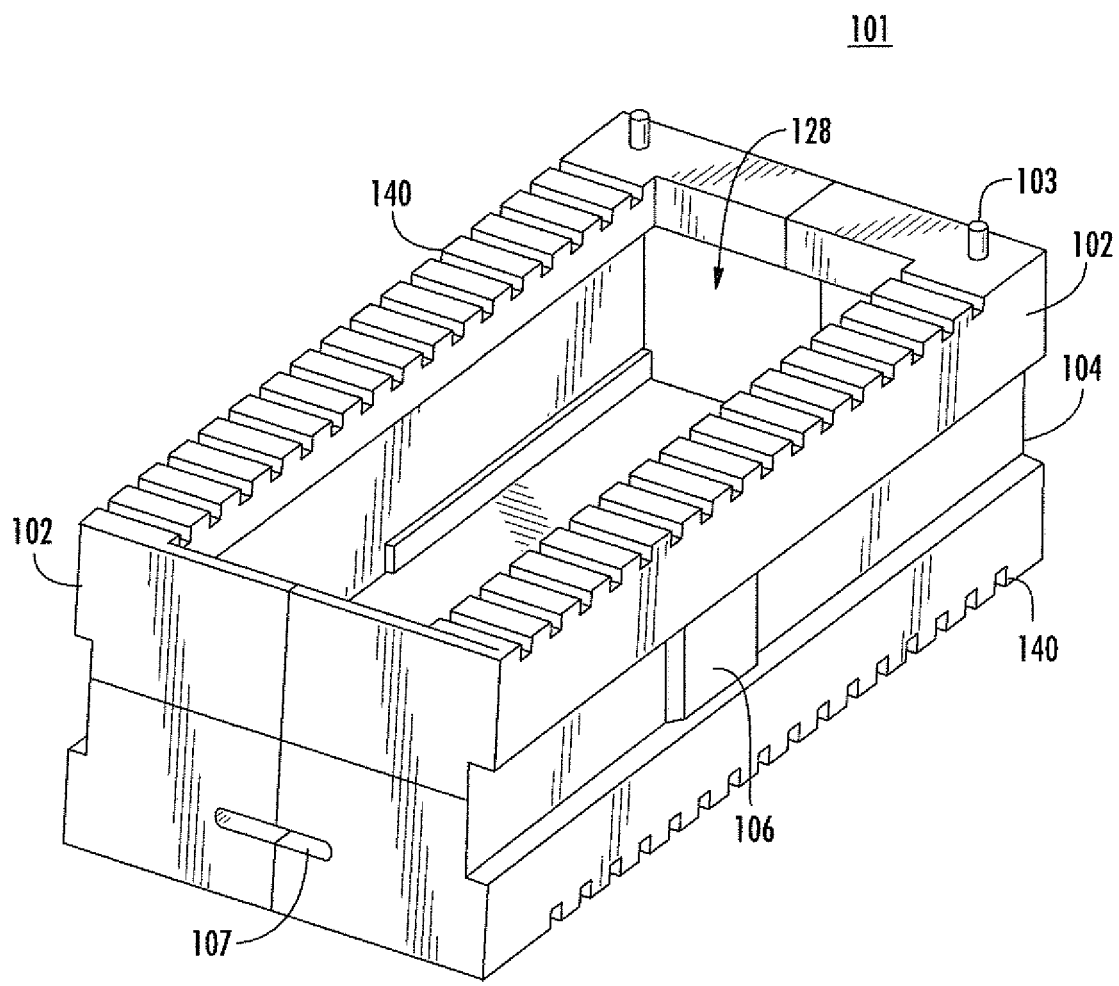
FIG. 1A is a perspective view of the header body elements of the connector insert assembly shown in FIG. 1.
Figure 1B:
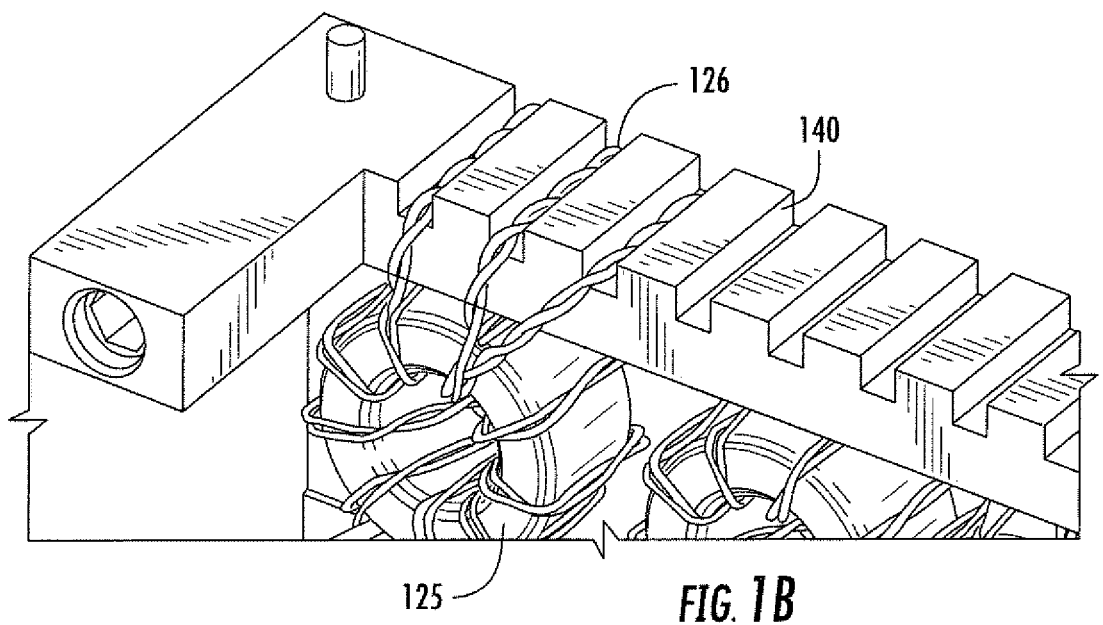
FIG. 1B is a perspective view of the header body elements of FIG. 1A with wire ends of various electronic components routed therein in accordance with an exemplary embodiment of the present disclosure.
Figure 1C:
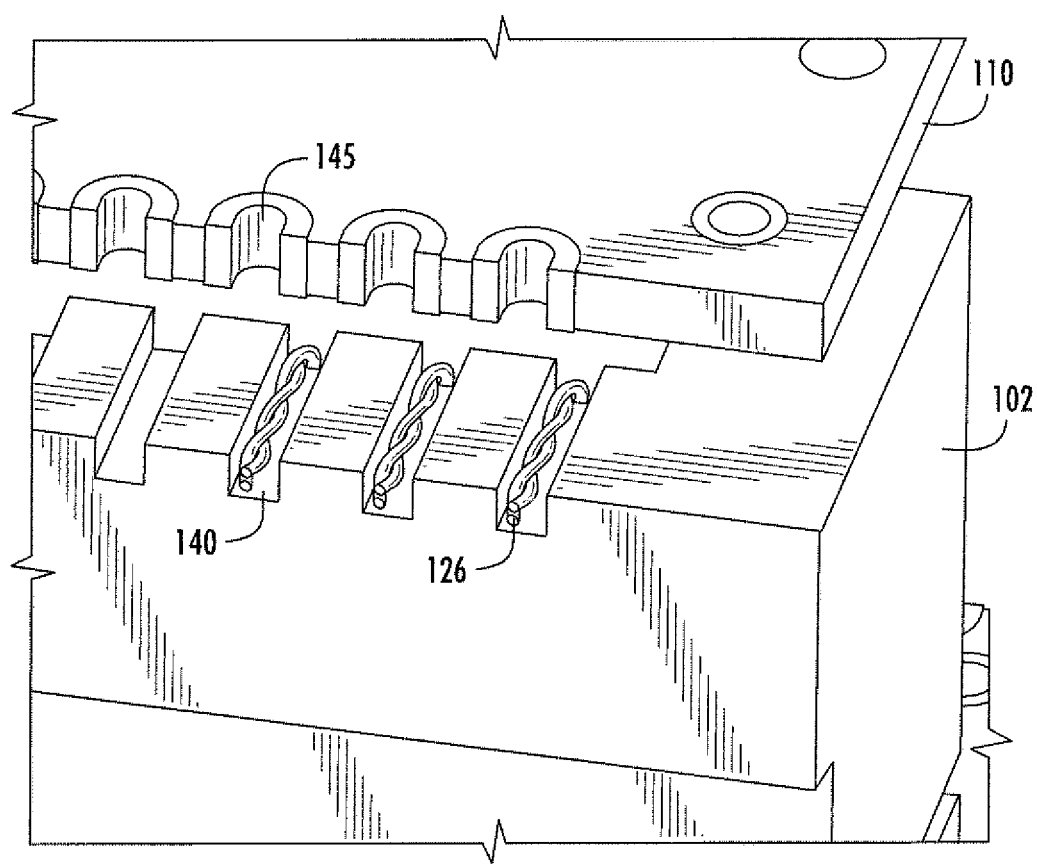
FIG. 1C is a perspective view of the wire routed header body elements of FIG. 1B illustrated just prior to being secured to a printed circuit board.
Figure 1D:
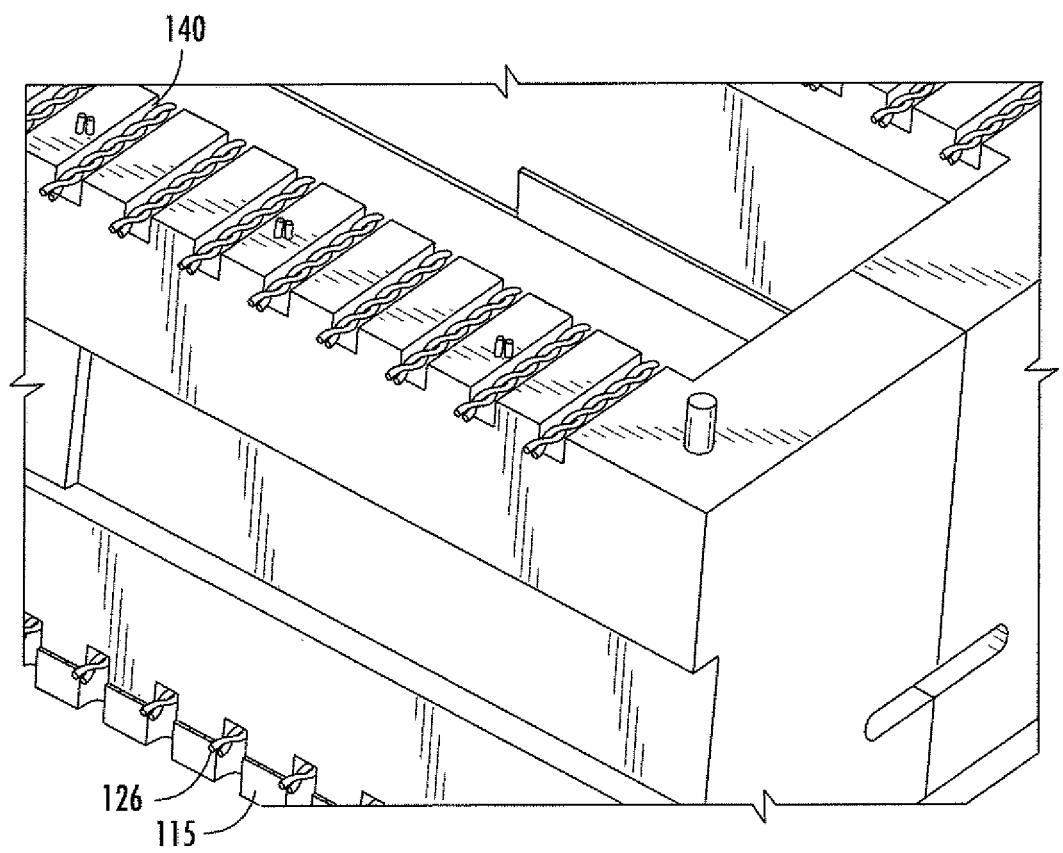
FIG. 1D is a perspective view of the header body elements of FIG. 1A with wire ends of various electronic components routed therein in accordance with one embodiment of the present disclosure.
Figure 1E:
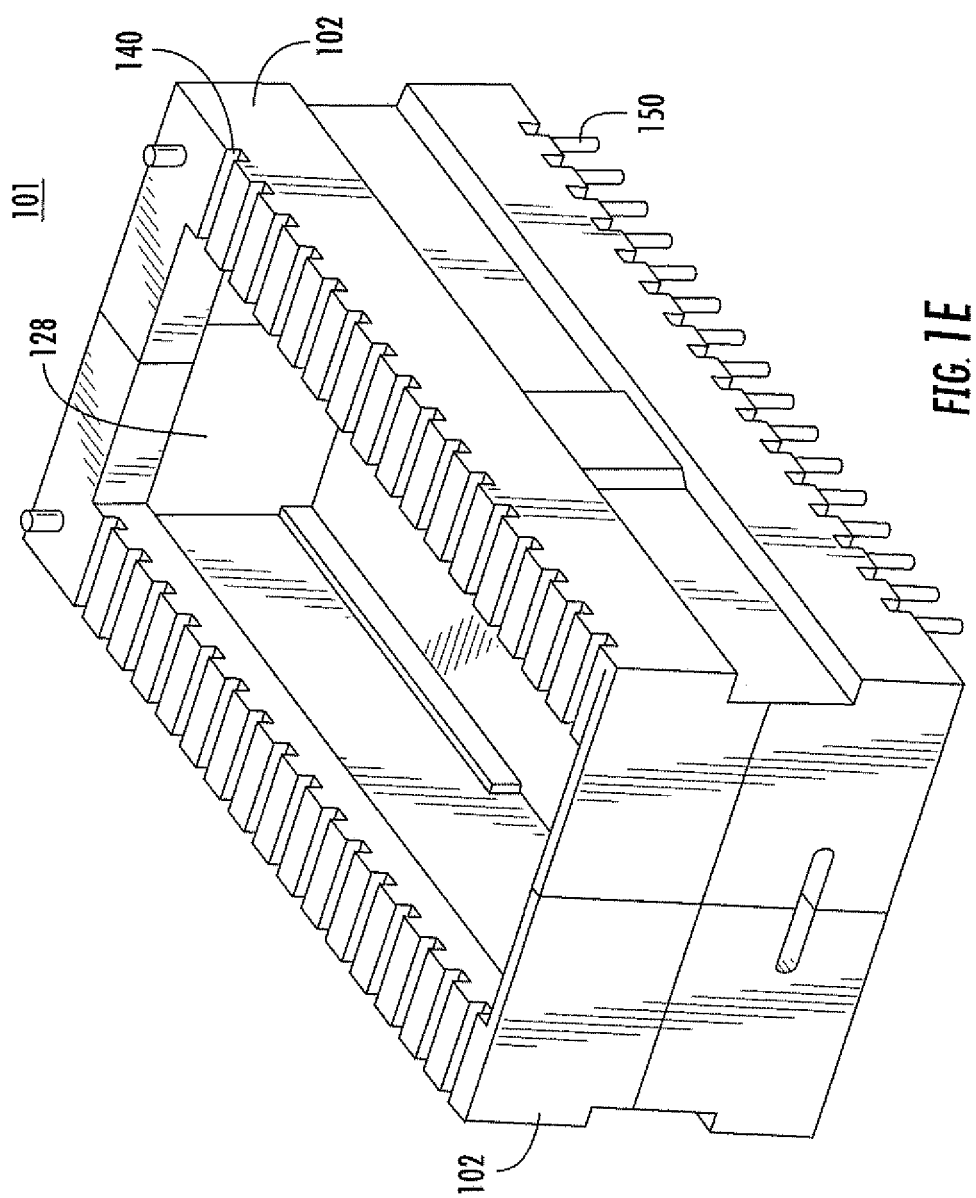
FIG. 1E is a perspective view of an alternative embodiment of a header body element according to the principles of the present disclosure.

Referring now to FIGS. 1-1E, exemplary configurations of a connector insert assembly are shown and described in detail. FIG. 1 is a cross-section view of an exemplary connector insert assembly 100. The connector insert assembly shown in FIGS. 1-1E is configured to be received within the connector housing 302 of a connector assembly 300 as shown in, for example, FIG. 3. The general use of connector insert assemblies within a single or multi-port connector assembly is known and is described, for example, in co-owned U.S. Pat. No. 7,241,181 filed Jun. 28, 2005 and entitled "Universal Connector Assembly and Method of Manufacturing", the contents of which are incorporated herein by reference in its entirety, although it will be appreciated that this configuration is merely exemplary, and others may readily be used consistent with the disclosure.

Referring again to FIG. 1, the connector insert assembly embodiment illustrated includes an upper substrate 110, as well as a lower substrate 115 with an insert body assembly 101, or interlock base, positioned between the upper and lower substrates. It will be appreciated that the terms "upper" and "lower" as used herein are meant in a completely relative sense, and are not in any way limiting or indicative of any preferred orientation. For example, where the connector insert assembly is installed on the underside of a substantially horizontal motherboard, the "upper" terminals would actually be disposed below the "lower" terminals. The upper and lower substrates are, in an exemplary embodiment, secured to the insert body assembly via an interference fit between posts located on the insert body assembly and holes contained within the upper and lower substrates. As an alternative, or in addition to the interference fit posts, solderable terminals are inserted into the insert body assembly and the upper and lower substrates are subsequently soldered to these solderable terminals. In one exemplary implementation, a minimum of four (4) copper terminals are insert molded into the underlying insert body assembly and are generally positioned at the four (4) corners of the insert body assembly. These copper terminals will hold the substrates temporarily until they are permanently soldered to both the top and bottom substrates during the wire termination solder operation. This wire termination solder operation may utilize one or more industry standard processing practices such as solder dipping, heated iron solder, laser solder, solder paste in combination with a reflow oven, solder wave, selective solder wave, etc. Alternatively, the substrates can be secured to the insert body assembly via an adhesive, such as an epoxy, encapsulant, or yet other suitable substance or mechanism.

Positioned on the upper substrate is a terminal insert assembly 129 comprised of an upper terminal insert assembly and lower terminal insert assembly. The mounting of the terminal insert assemblies to the upper substrate is described in, for example, co-owned U.S. Pat. No. 7,241,181 filed Jun. 28, 2005 and entitled "Universal Connector Assembly and Method of Manufacturing", the contents of which were previously incorporated by reference in its entirety. The lower substrate 115 has, in the illustrated embodiment, four (4) chip choke assemblies 130 disposed thereon. These chip choke assemblies comprise, in an exemplary embodiment, the chip choke assemblies described in co-owned and co-pending U.S. Patent Provisional Application Ser. No. 61/732,698 filed Dec. 3, 2012 and entitled "Choke Coil Devices and Methods of Making and Using the Same", the contents of which is incorporated herein by reference in its entirety.

Positioned adjacent to the upper and lower substrates is a pair of insert body elements (102, FIG. 1A) which collectively forms insert body assembly 101. While the insert body assembly 101 is illustrated as being composed off of a pair of insert body elements, it is appreciated that more (i.e. three (3) or more) or less (i.e. one (1)) insert body element embodiments are envisioned herein. The insert body elements illustrated in FIG. 1 collectively form a cavity that is configured to house the chip choke assemblies disposed on the lower substrate as well as a number of wire wound electronic components 125 (e.g. wound toroids).

Referring now to FIG. 1A, the illustrated insert body assembly 101 consists of two insert body elements 102 generally made from a high-temperature polymer (e.g., a liquid crystal polymer (LCP)) and preferably formed by an injection molding process. The insert body assembly of FIG. 1A differs from that shown in FIG. 1, as the insert body assembly of FIG. 1 is for use with one or more chip choke assemblies while the embodiment shown in FIG. 1A is configured specifically for use with wound toroidal chokes. The insert body assembly includes an electronic component cavity 128 that is configured to receive any number of electronic components, including the aforementioned chip chokes and toroid wire wound electronic components. In an exemplary embodiment, the wire wound electronic components included within the cavity 128 comprise wound toroids. Although not illustrated with features that conform to the inserted electronic components, the cavity can incorporate toroidal molded shapes so as aid in the positioning of the coils within the electronic component receiving cavity in an alternative embodiment. The use of electronic component receiving cavities which are shaped to accommodate the electronic components received therein are described in co-owned U.S. Pat. No. 5,015,981 issued on May 14, 1991 and entitled "Electronic Microminiature Packaging and Method", the contents of which are incorporated herein by reference in its entirety.

On the top surface of each of the illustrated embodiment of the insert body elements 102 are substrate positioning posts 103 which are formed from the underlying injection molded polymer. The insert body assembly 101 also includes a lateral groove 104 that is formed on the side surfaces of each of the insert body elements and is configured for mating with respective features on the connector housing (FIG. 3, 302). The lateral groove also includes an engagement feature 106 configured for mating with a respective feature of the connector housing. The lateral groove in combination with the engagement features are adapted to position and mechanically lock the insert body assembly within the connector housing. Located on the top surface of the illustrated insert body elements are termination slots 140 which are used to terminate the wire wound electronic components to the upper and/or lower substrates. The termination slots 140 will be discussed in additional detail with respect to FIGS. 1B-1D.

Referring now to FIGS. 1B-1D, the exemplary wire termination feature of the present disclosure is shown and described in detail. FIG. 1B illustrates a detailed view of the termination slots 140 present on the top surface of the insert body elements with wire ends 126 from a wound electronic component 125 disposed therein. The depth of each of these termination slots is sized to accommodate the wire ends 126 of the wound electronic component. For example, in an embodiment where four (4) wires are configured to be accommodated in one termination slot and each wire has a diameter of five mils (0.005 inches), the wires are twisted together such that they create a twisted wire end bundle having a twelve mil (0.012 inch) maximum diameter. In such a proposed configuration, the slot width and depth will each be approximately twenty mils (0.020 inches). Such a configuration enables the termination slot, and associated substrate, to secure the bundled wire ends prior to termination to the substrate. While a four (4) wire embodiment comprised of five mil (0.005 inches) wire is described herein, it is appreciated that other wire configurations and/or wire sizes could be readily substituted with appropriate modification of the termination slot dimensions, such modification being within the skill of the ordinary artisan given this disclosure.

Referring now to FIG. 1C, another detailed view of the termination slots 140 of the insert body is illustrated with the wire ends 126 positioned within these termination slots. Prior to inserting the wire ends within these terminations slots, in an exemplary embodiment, the insulation should be first removed from the wire ends. The removal of the insulation can be accomplished using any number of known insulation removal techniques including for instance via laser ablation after assembly, a solder dip of the termination ends prior to assembly or by a solder dipping process which removes the insulation during termination of the wire ends to each of the substrates. The upper substrate 110 is positioned above insert body element with the plated terminations 145 of the upper substrate aligned so as to match up with respective termination slots. In one exemplary embodiment, the substrate is screen printed with a eutectic solder paste. The substrate is then mechanically secured to the insert body elements with the wire ends of the wound electronic components positioned within the termination slots and adjacent to the screen printed substrate(s). The screen printed solder paste is then heated (e.g., in a solder reflow oven) and the screen printed solder paste melts and bonds with the underlying wire ends thereby securing the wire ends from the wire wound electronic components to the substrate.

In an alternative embodiment, the substrate is not screen printed with a solder paste; rather the substrate is merely mechanically positioned over the termination slots as shown in FIG. 1C. The substrate acts to fix the wire ends within the termination slots. The resultant assembly is subsequently mass terminated, such as via a wave soldering or a selective solder fountain methodology. The process of holding/positioning the wires after they are arranged in the termination slot can be accomplished using a separate assembly fixture or by appropriate form or fit design within the insert body assembly itself. Referring now to FIG. 1D, after securing the wire ends 126 to one of the substrates (here the bottom substrate 115), the wire ends for the other side of the insert body assembly 101 are positioned within respective termination slots 140 and subsequently soldered to an adjacent substrate (i.e., the upper substrate in the illustrated embodiment).

The exemplary slotted termination method illustrated in FIGS. 1B-1D is advantageous over prior art methods, in that the insert body assembly 101 is less costly to manufacture, as the insert body assembly does not require or limits the number of post-inserted or insert molded pins. Additionally, such a configuration also requires less manufacturing labor to produce (along with the resultant costs associated with this manufacturing labor) due to the fact that it eliminates the wire wrapping methodologies required in the prior art.

Referring now to FIG. 1E, an alternative embodiment of an insert body assembly 101 consisting of two insert body elements 102 generally made from a high-temperature polymer and formed by an injection molding process is illustrated. Similar to the embodiment shown in FIG. 1A, the insert body assembly includes an electronic component receiving cavity 128 that is configured to receive any number of wire wound and non-wire wound electronic components. Also included on the top surface of the insert body elements 102 are optional substrate positioning posts 103 as well as termination slots 140 which are used to terminate the wire wound electronic components to the upper and/or lower substrates. However, unlike the embodiment illustrated in FIG. 1A, the insert body elements further includes a plurality of insert molded or post-inserted terminals 150 positioned on the underside of the insert body elements. The utilization of the terminals 150 is discussed below with respect to FIG. 1F.

Figure 1F:
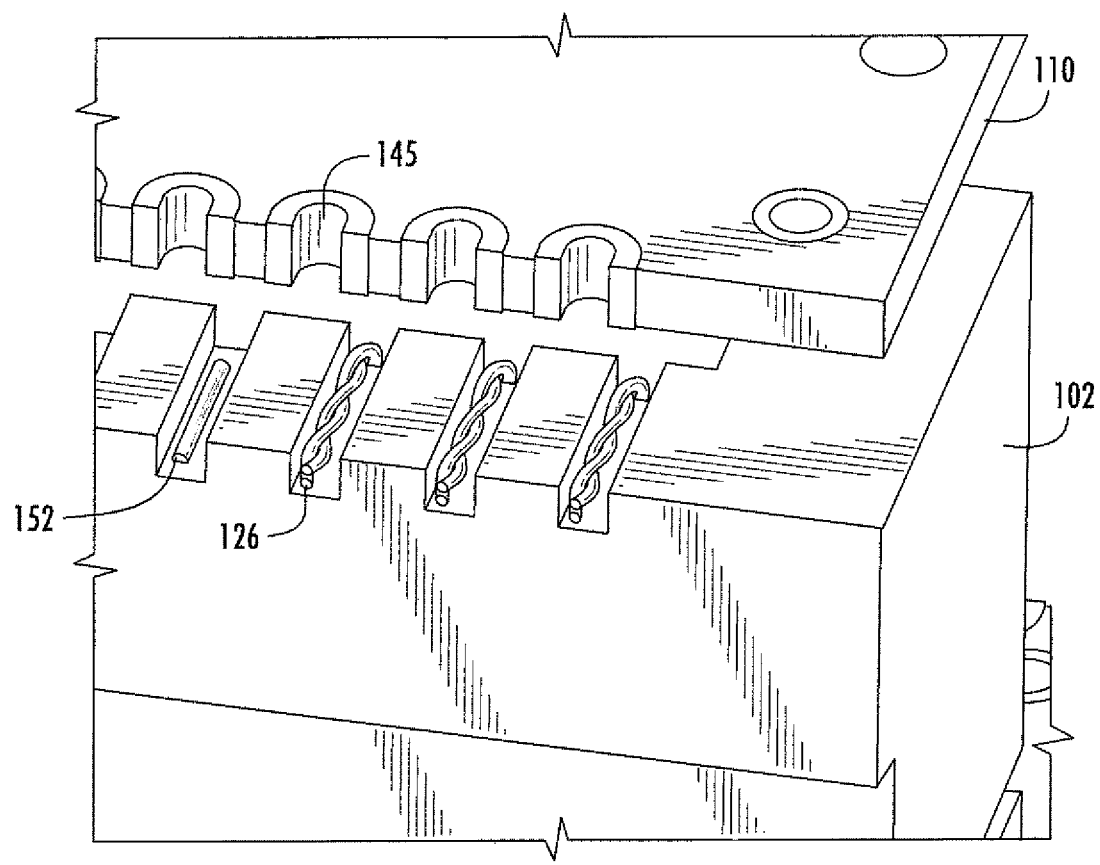
FIG. 1F is a perspective view of the wire routed header body elements of FIG. 1E illustrated just prior to being secured to a printed circuit board.

Referring now to FIG. 1F, a detailed view of the termination slots 140 illustrated in FIG. 1E is shown and described in detail. Specifically, positioned within each of the termination slots are the termination ends 152 of the terminals shown in FIG. 1E. As shown, each of these terminals is insert-molded or post inserted within insert body elements 102 such that a top portion of the terminals remains exposed within the insert body element termination slots. The wire ends 126 are then positioned over the termination ends and sandwiched between the substrate 110 and the insert body element. In one exemplary embodiment, the substrate is solder dipped or soldered using, for example, a selective solder fountain to secure the wire ends to the substrate and to the termination ends of the terminals simultaneously. The substrate is then mechanically secured to the insert body elements with the wire ends of the wound electronic components positioned within the termination slots over the termination ends. In an alternative embodiment, a screen printing process is used such that the screen printed solder paste is heated (e.g., in a solder reflow oven) and the screen printed solder paste melts and bonds with the underlying wire ends.

In an alternative embodiment, the substrate is not screen printed with a solder paste; rather the substrate is merely mechanically positioned over the termination slots as shown in FIG. 1F. The substrate acts to fix the wire ends within the termination slots. The resultant assembly is subsequently mass terminated, such as via the aforementioned wave soldering methodology.

Figure 2A:
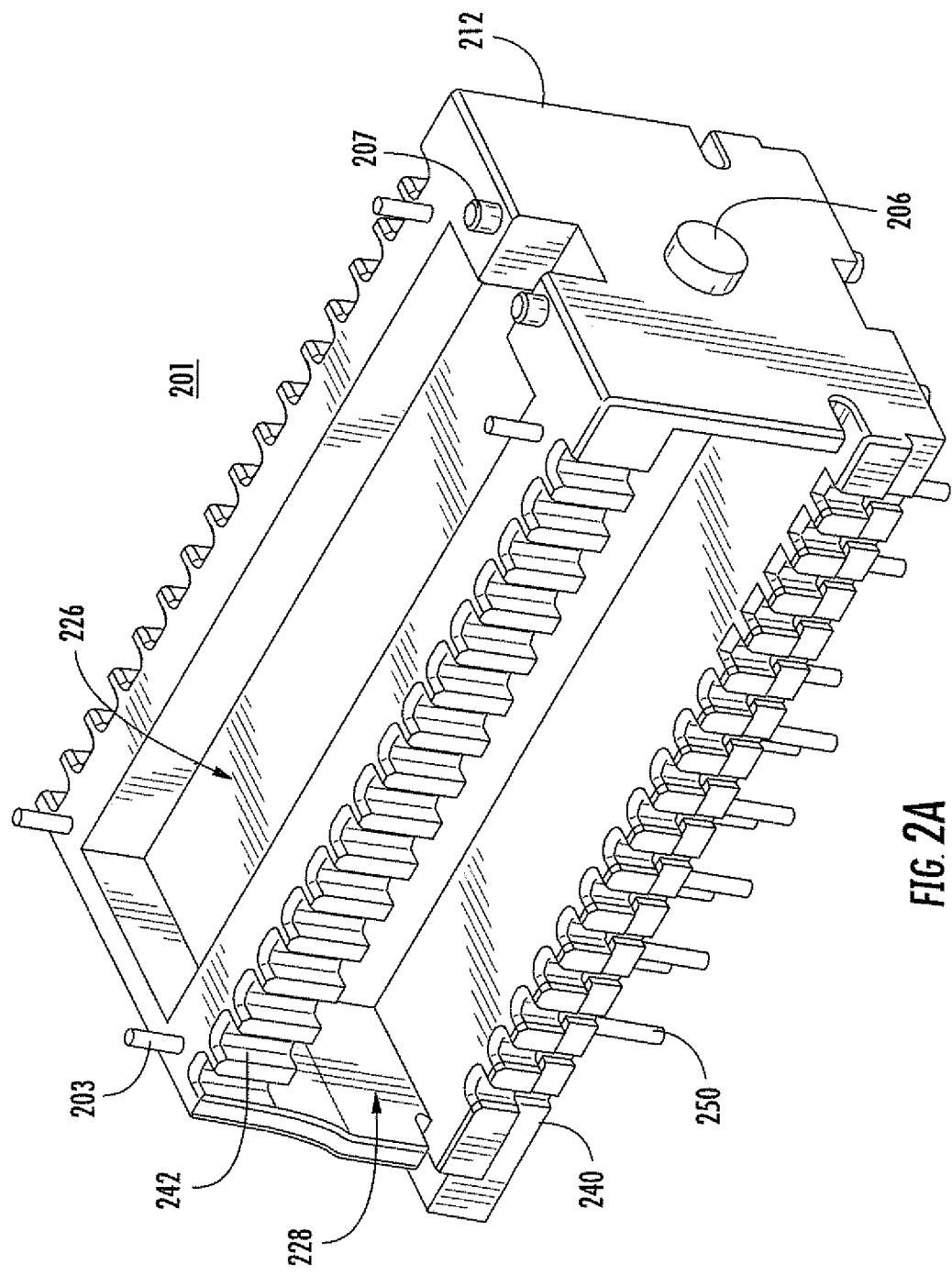
FIG. 2A is a perspective view of a second embodiment of a header body element according to the principles of the present disclosure.

Referring now to FIGS. 2A-2E, an alternative configuration of a connector insert assembly is shown and described in detail. FIG. 2A illustrates a perspective view of a header body element 201 manufactured in accordance with the principles of the present disclosure. The embodiment illustrated in FIG. 2A differs substantially from that shown in, for example, FIG. 1A in that the connector insert assembly is formed from a single piece of an insert molded or post inserted polymer header 212. The header body element includes a number of cavities including a wire wound electronic component receiving cavity 228, as well as an electronic component receiving cavity 226 adapted to accommodate electronic components located on the underside of the upper substrate as shown in FIG. 2C (210).

Positioned adjacent the wire wound electronic component receiving cavity 228 are a plurality of termination slots 240, 242. The upper termination slots 242 are configured to route the wire ends from a wire wound electronic component (e.g. a toroid-shaped transformer or wire-wound choke coil) to an upper substrate while the lower termination slots 240 are configured to route the wire ends from a wire wound electronic component to a lower substrate. However, unlike the embodiment illustrated with respect to FIGS. 1-1F, the wire ends are not sandwiched between the substrate and the termination slots. In the illustrated embodiment, the header body element includes four (4) solderable alignment posts 203 on a top surface of the header body element as well as two (2) larger diameter alignment posts 207 that are configured to properly position the upper substrate with respect to the header body element. The terminal pins 250 located on the underside of the header body element are configured to properly position the lower substrate with respect to the header body element. In addition, the header body element includes a back post 206 which helps to align the header body element within the body of the connector housing (see, e.g., FIGS. 3-3E discussed below).

Figure 2B:
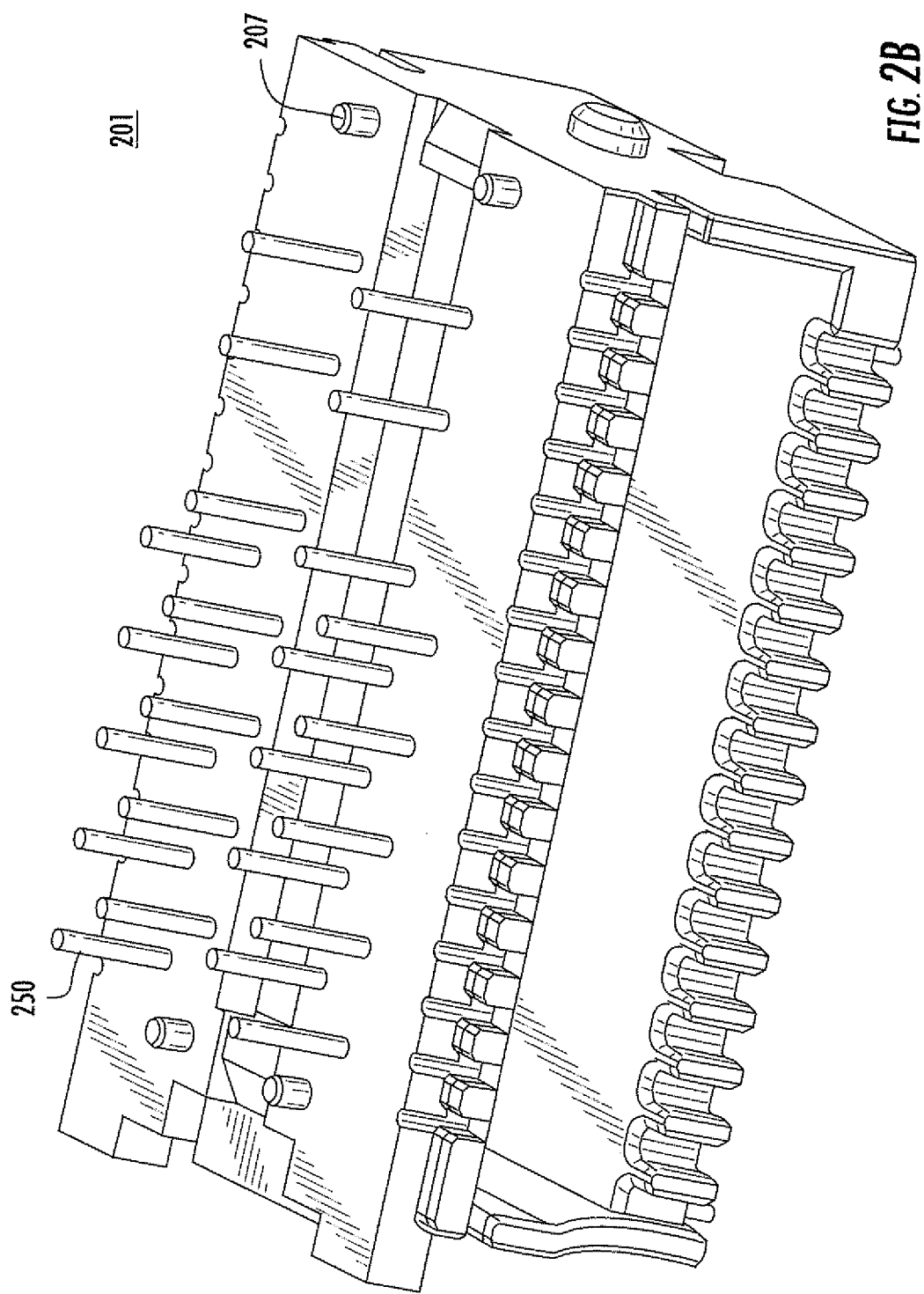
FIG. 2B is a perspective view of the underside of the header body element shown in FIG. 2A.

Referring now to FIG. 2B, the underside of the header body element 201 shown with respect to FIG. 2A is illustrated. Specifically, the relative positioning of the terminal pins 250 is shown along with four (4) alignment posts 207 which help to facilitate the positioning of the lower substrate as discussed supra. Furthermore, while a specific configuration is shown for the terminal pins 250, it is appreciated that any number of different terminal pin configurations such as those shown in U.S. Pat. No. 7,241,181 issued on Jul. 10, 2007 and entitled "Universal Connector Assembly and Method of Manufacturing"; and U.S. Pat. No. 6,962,511 issued on Nov. 8, 2005 and entitled "Advanced Microelectronic Connector Assembly and Method of Manufacturing", the contents of each of the foregoing being incorporated herein by reference in its entirety, can be readily substituted.

Referring now to FIG. 2C, the termination of the wire ends 230 to the upper substrate 210 is shown and described in detail. Specifically, the upper substrate 210 is positioned on top of the header body element and the wire ends from wire wound electronic components located within the cavity of the header body element are routed into respective termination slots and secured to a temporary cover 270. The cover 270 is preferably manufactured using a high temperature polymer that is designed to protect, for example, surface mount electronic components (see FIG. 2D, 260) located on the upper substrate during the termination process. The cover is intended to be reusable on the manufacturing production line for the connector insert assembly 200. The wire ends 230 are secured to the upper substrate 210 via a soldering process (e.g. solder dipping) and are subsequently cut via either a manual or automated process. Such a configuration is desirable in that it enables repeatable solder connections as well as automation with respect to wire trimming and cover removal. While discussed with respect to the upper substrate 210, it is appreciated that a similar process can also be performed for securing the wire ends to the lower substrate 215.

Furthermore, it is appreciated that the upper substrate 210 and the techniques for providing signal paths to the electromagnetic interference (EMI) shield, and ultimately ground, for the upper substrate, are described in commonly owned and co-pending U.S. patent application Ser. No. 13/797,527 filed Mar. 12, 2013 and entitled "Shielded Integrated Connector Modules and Assemblies and Methods of Manufacturing the Same", the contents of which are incorporated herein by reference in its entirety. Additionally, the lower substrate 215 is, in an exemplary embodiment, comprised of a substrate shield as described in co-owned U.S. Pat. No. 6,585,540 issued on Jul. 1, 2003 and entitled "Shielded Microelectronic Connector Assembly and Method of Manufacturing", the contents of which are incorporated herein by reference in its entirety.

Figure 2D:
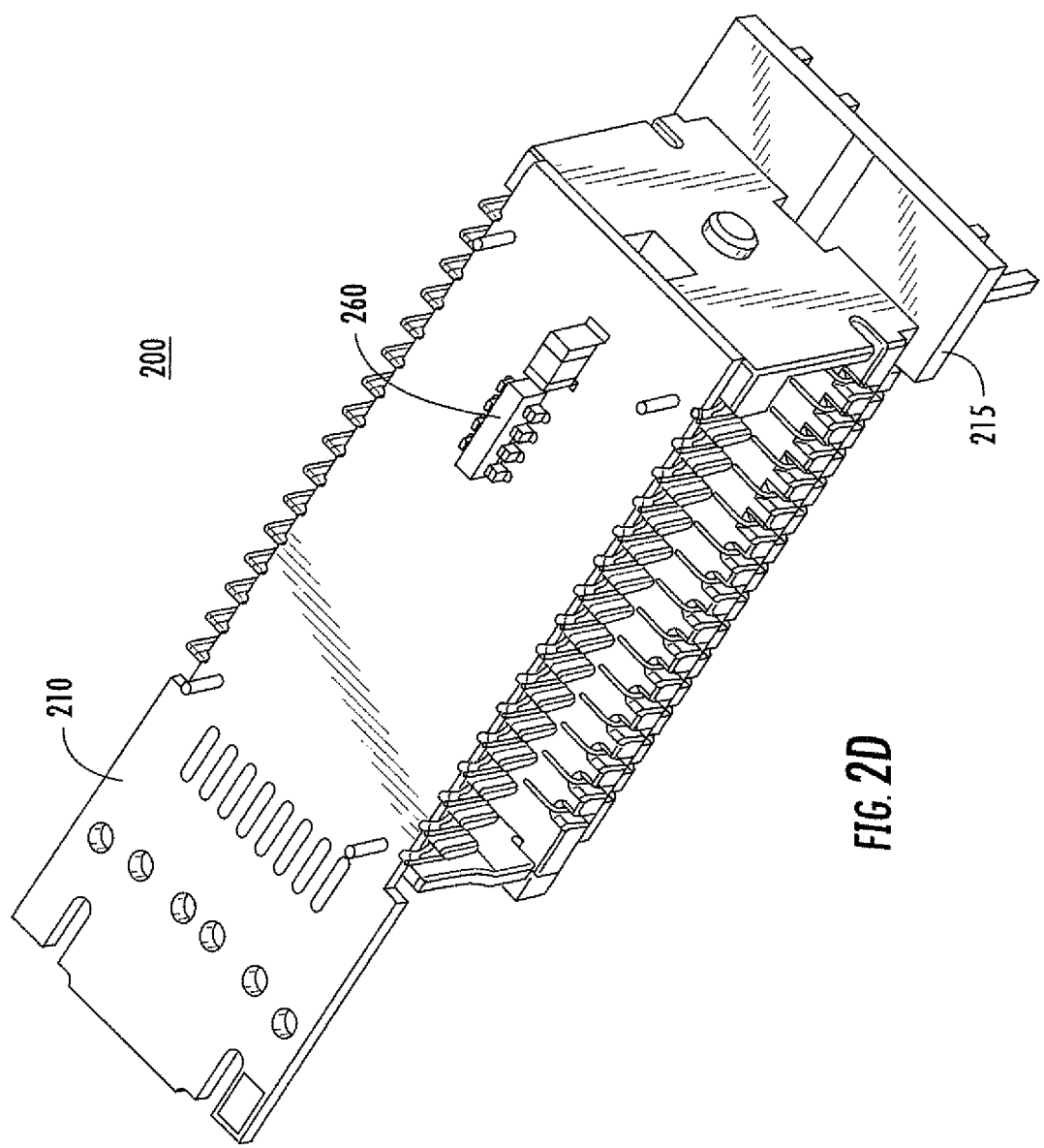
FIG. 2D is a perspective view of the connector insert assembly of FIG. 2C with the solder cover removed from view.
Figure 2E:
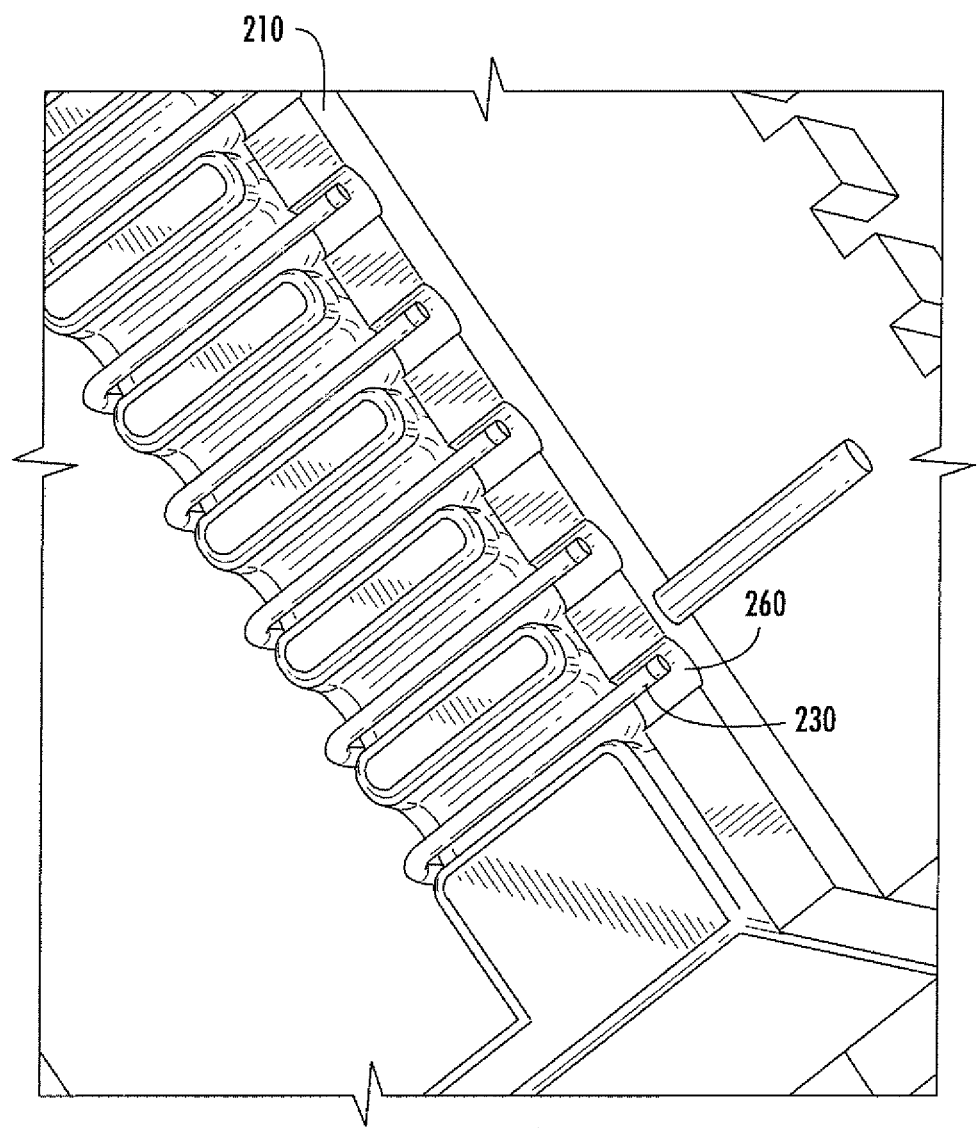
FIG. 2E is a detailed perspective view of the soldered terminations of the connector insert assembly as shown in FIG. 2D.

Referring now to FIG. 2D, the cover is shown removed from view from the connector insert assembly 200. Specifically, the upper substrate 410 is illustrated with a plurality of surface mounted electronic components 260 positioned on a surface thereof. FIG. 2E illustrates a detailed view the wire ends 230 terminated to the upper substrate 210 at soldered terminations 260.

Multi Port Embodiment

Figure 3A:
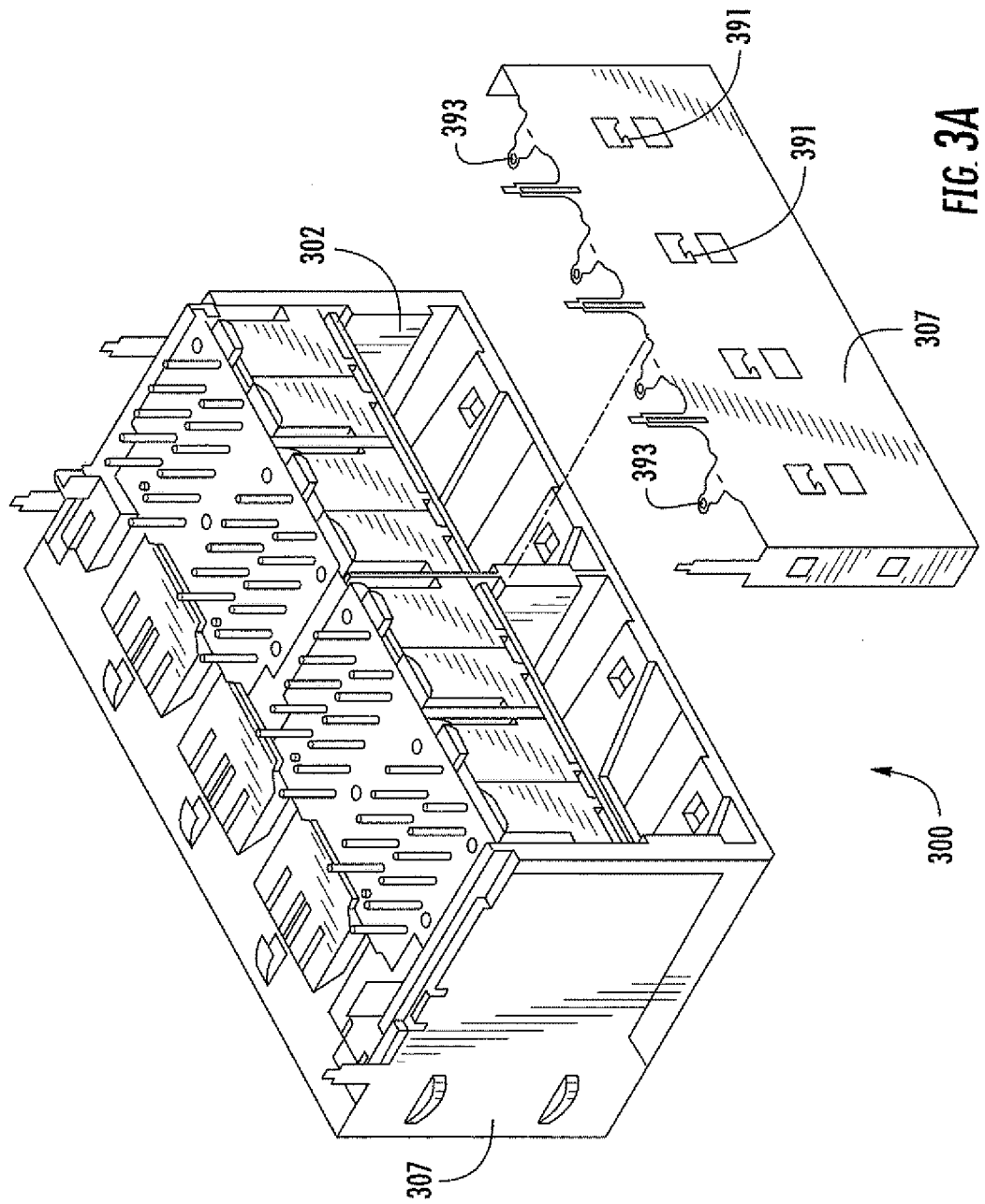
FIG. 3A is a rear perspective view of the connector assembly of FIG. 3, showing the rear shield removed.
Figure 3B:
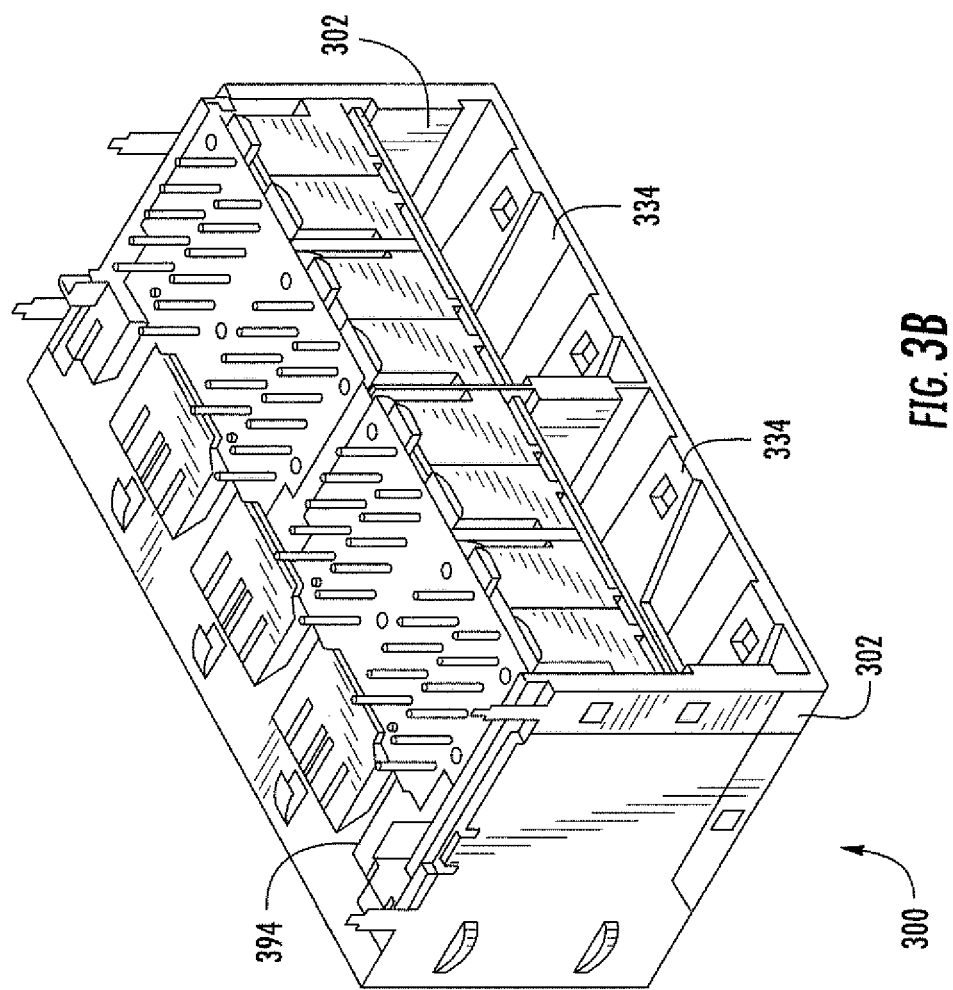
FIG. 3B is a rear perspective view of the connector assembly of FIG. 3, showing the relationship between the shield and the lower substrate.
Figure 3C:
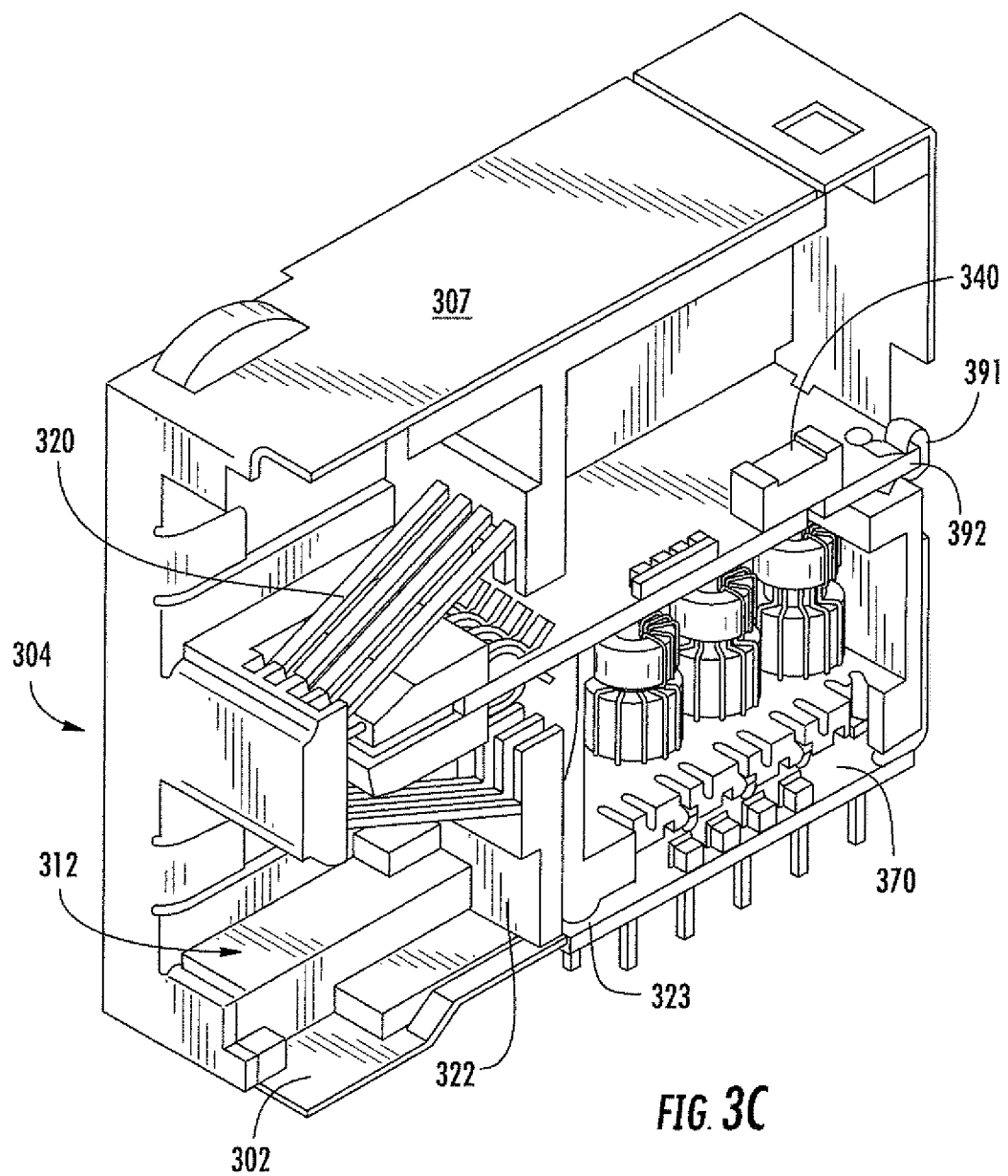
FIG. 3C shows side perspective cutaway views of the connector assembly according to FIG. 2, taken along line 3C-3C.
Figure 3D:
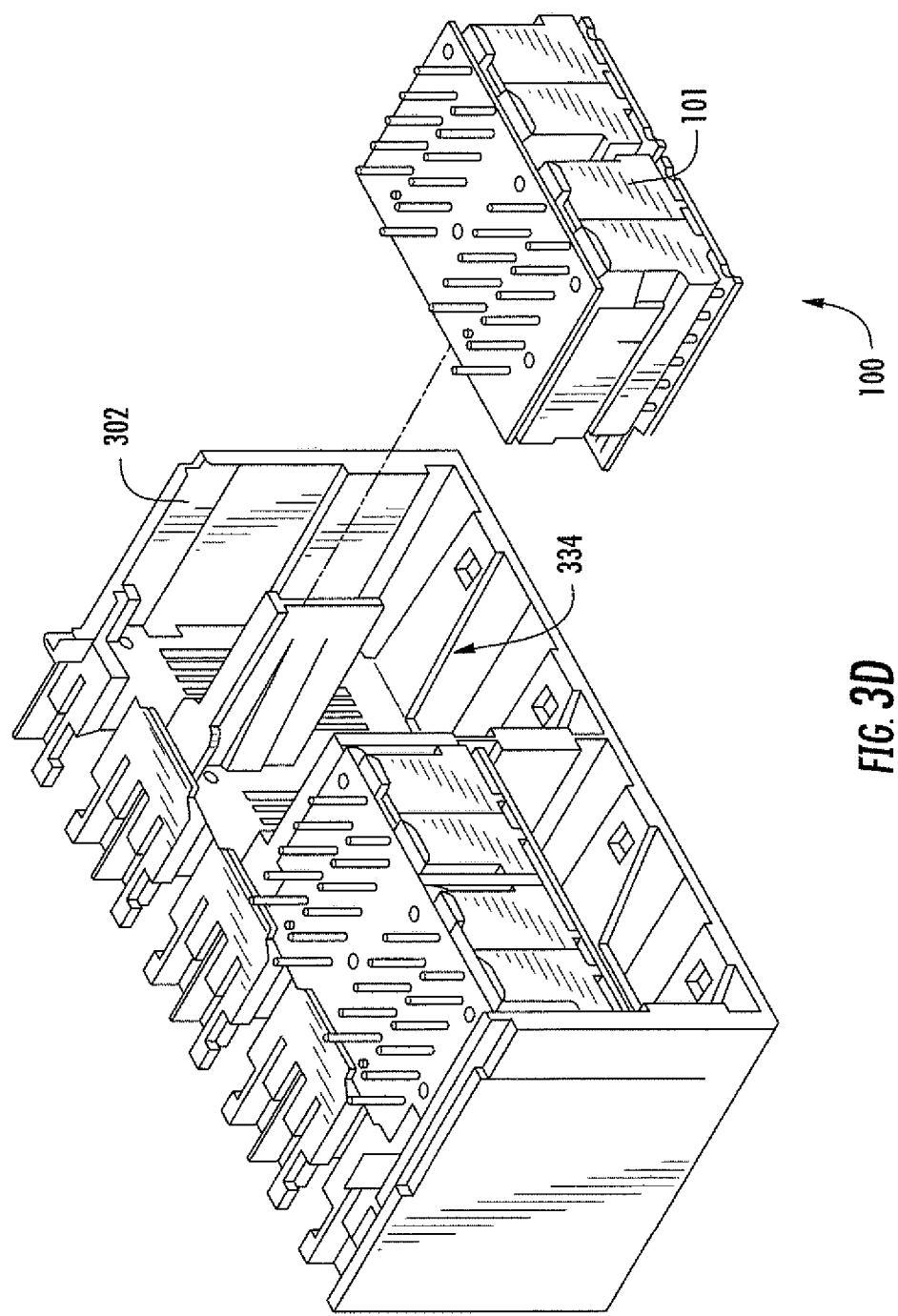
FIG. 3D is a rear perspective view of the connector assembly of FIG. 3, showing one insert assembly removed.
Figure 3E:
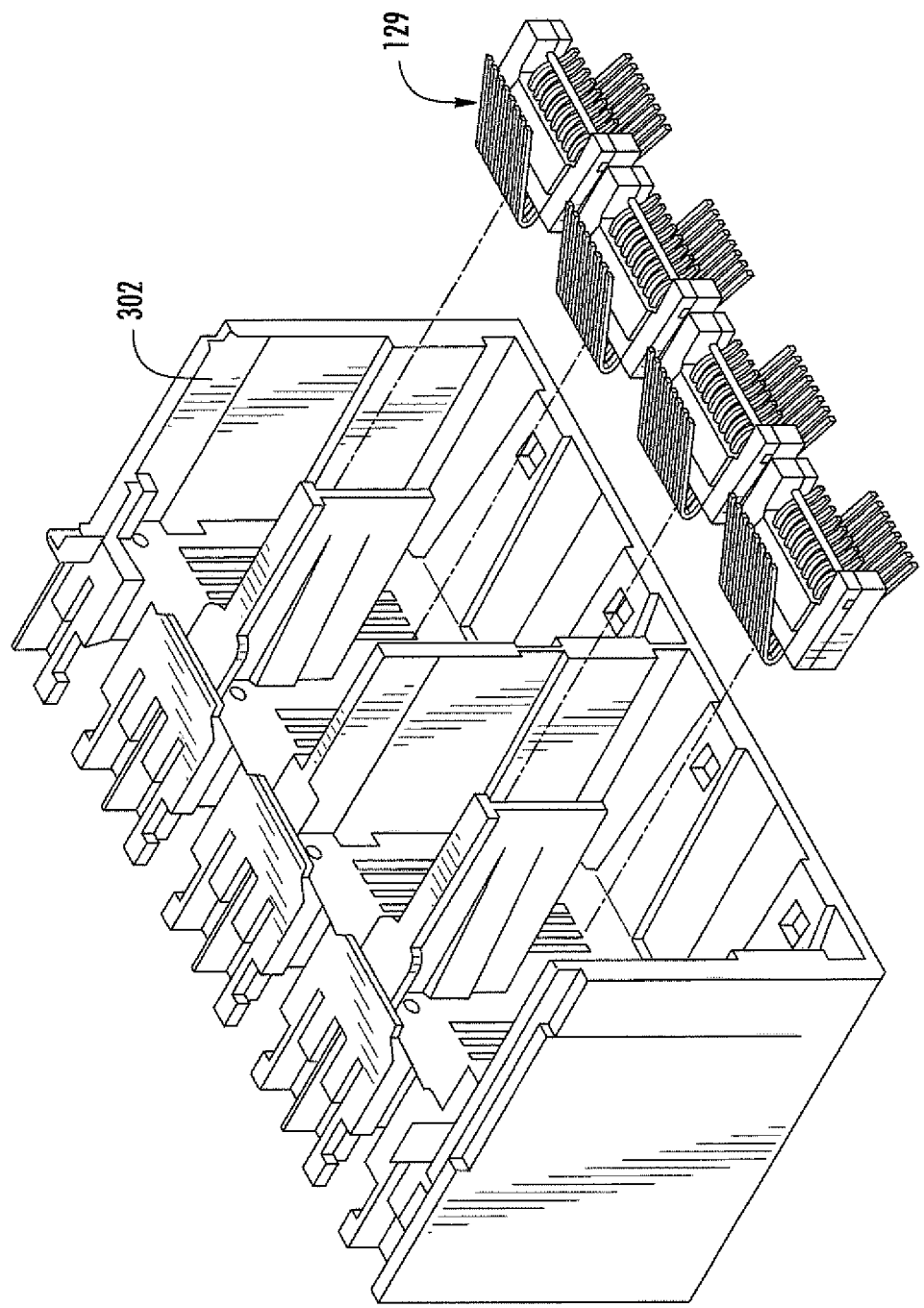
FIG. 3E is a rear perspective view of the housing element of the connector assembly of FIG. 3, showing the terminal insert assemblies removed and various housing element details.

Referring now to FIGS. 3-3E, a first embodiment of the connector assembly for use with the insert body assembly of FIGS. 1-1F, 2-2E, and 6A-7 of the present disclosure is shown and described in detail. Specifically, and as shown in FIG. 3, the assembly 300 generally comprises a connector housing element 302 having a plurality of individual connectors 304 formed therein. Specifically, the connectors 304 are arranged in the illustrated embodiment in side-by-side row fashion within the housing 302 such that two rows 308, 310 of connectors 304 (i.e. port pairs) are formed, one disposed atop the other ("row-and-column"). The front walls 306a of each individual connector 304 are further disposed parallel to one another and generally coplanar, such that modular plugs may be inserted into the plug recesses 312 formed in each connector 304 simultaneously without physical interference. The plug recesses 312 are each adapted to receive one modular plug (not shown) having a plurality of electrical conductors disposed therein in a predetermined array, the array being so adapted to mate with respective conductors 120a and 120b present within in each of the recesses 312 thereby forming an electrical connection between the plug conductors and connector conductors as described in greater detail below.

The rows 308, 310 of the embodiment of FIG. 3 are oriented in mirror-image fashion, such that the latching mechanism for each connector 304 in the top row 308 is reversed or mirror-imaged from that of its corresponding connector in the bottom row 310. This approach allows the user to access the latching mechanism (in this case, a flexible tab and recess arrangement of the type commonly used on RJ modular jacks, although other types may be substituted) of both rows 308, 310 with a minimal degree of physical interference. It will be recognized, however, that the connectors within the top and bottom rows 308, 310 may be oriented identically with respect to their latching mechanisms, such as having all the latches of both rows of connectors disposed at the top of the plug recess 312, if desired. The connector housing element 302 is in the illustrated embodiment electrically non-conductive and is formed from a thermoplastic (e.g. PCT Thermex, IR compatible, UL94V-0), although it will recognized that other materials, polymer or otherwise, may conceivably be used. An injection molding process is used to form the housing element 302, although other processes may be used, depending on the material chosen. The selection and manufacture of the housing element is well understood in the art, and accordingly will not be described further herein.

As shown in FIGS. 3A and 3B, the connector assembly may also be shielded with, inter alia, an external tin or alloy noise (i.e. EMI) shield 307 of the type well known in the connector arts. A plurality of grooves 322 which are disposed generally parallel and oriented vertically within the housing 302 are formed generally within the recess 312 of each connector 304 in the housing element 302. The grooves 322 are spaced and adapted to guide and receive the aforementioned conductors 120 that are used to mate with the conductors of the modular plug. The conductors 120 are formed in a predetermined shape and held within one of a plurality of conductor or terminal insert assemblies 129 each formed from, for example, two (2) sub-assemblies, the latter also being received within the housing element 302 as shown in FIG. 3C. Specifically, the housing element 302 includes a plurality of cavities 334 formed in the back of respective connectors 304 generally adjacent to the rear wall of each connector 304 and extending forward into proximity of the recesses 312, each cavity 334 being adapted to receive the terminal insert assemblies 129. The first conductors 120a of the substrate/component assemblies 129 are deformed such that when the assemblies 129 are inserted into their respective cavities 334, the upper conductors 120a are received within the grooves 322, maintained in position to mate with the conductors of the modular plug when the latter is received within the plug recess 312, and also maintained in electrical separation by the separators 323 disposed between and defining the grooves 322. When installed, the respective terminal inserts 129 are in a substantially juxtaposed arrangement (see e.g., FIG. 3E). Each cavity is further adapted to receive an electronics insert assembly 100 of the type generally shown and described with respect to FIGS. 1-1F, FIGS. 2A-2E and FIGS. 6A-7.

Open Header Electronics Apparatus

Figure 4A:
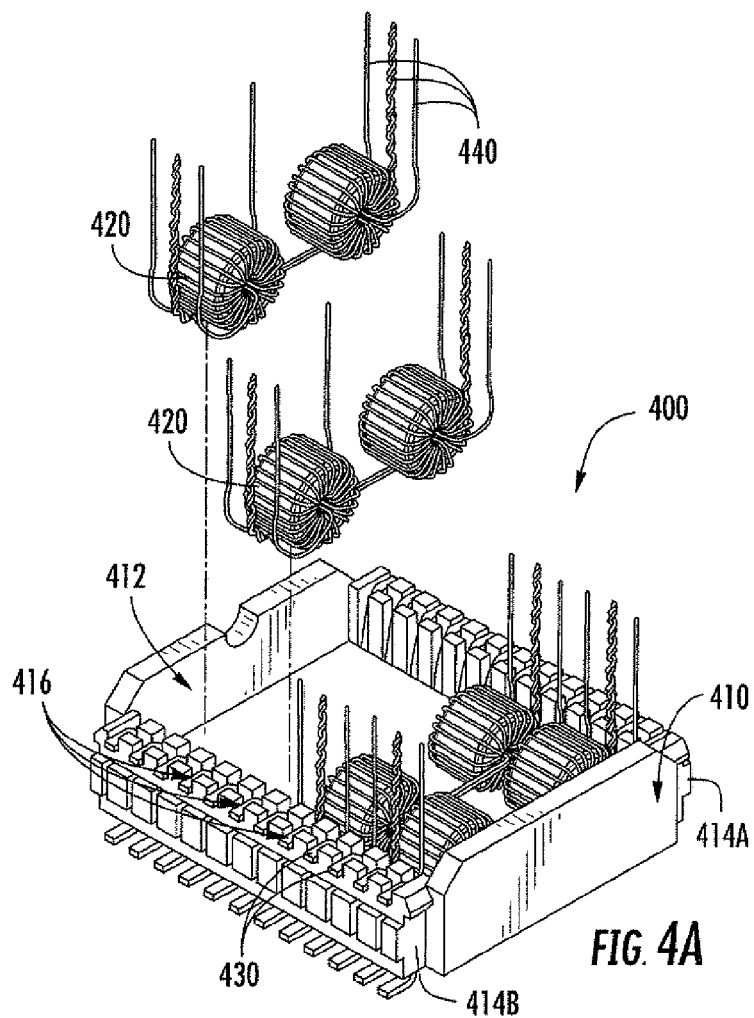
FIG. 4A is a perspective view of a first exemplary open header electronics apparatus having one or more inductive devices positioned therein in accordance with the principles of the present disclosure.

FIG. 4A generally depicts an open header electronic apparatus 400 for mounting onto the surface of a printed circuit board (not shown) comprising a header assembly 410 having an open top 412, sidewalls 414A and 414B, terminal pin notches 416, slots 418, and inductive devices 420 having wire leads 440 extending therefrom that are configured to be received within the header assembly 410. In the illustrated embodiment, the header assembly includes an open cavity 412 which can be encapsulated with, for example, a thermoset epoxy resin, silicone-based fillers, and/or other suitable encapsulants. While the illustrated header assembly 410 is shown with an open top, it is envisioned that in certain embodiments it would be desirable for the open header electronic apparatus 400 to include a top cover (not shown) that would snap onto or otherwise completely or partially seal the open cavity 412 of the header assembly. For example, in some embodiments, it would be desirable to include a top cover if the underlying inductive devices are electrically sensitive to being encapsulated with an epoxy resin or other filler material. Furthermore, one wall of the header assembly 410 is illustrated as including an orientation notch positioned such that the desired alignment of the open header electronic apparatus with respect to the printed circuit board upon which the open header electronic apparatus will be mounted can be readily discerned.

The two sidewalls 414A and 414B of the header assembly 410 also include insert molded terminal pins 430. In the illustrated embodiment, the insert molded terminal pins 430 comprise surface mountable terminals that possess a general "C-shaped" profile. In one exemplary embodiment, the terminal pins are manufactured from a copper or copper-based alloy that is over-plated with nickel and tin. While the use of copper or copper-based alloys is exemplary, it is appreciated that other conductive alloys (such as Alloy 42) could be readily substituted if desired. In addition, while the use of nickel and tin plating is exemplary due to recent pushes for lead-free ("Pb-free") terminals, it is also appreciated that many other suitable plating materials (including Pb-based plating) could also be readily substituted.

The cavity 412 of the header assembly 410 is sized appropriately to accommodate a plurality of wire-wound inductive devices 420. As is illustrated in the exemplary embodiment of FIGS. 4A-4B, these inductive devices 420 are arranged into channels (here a four-channel device is shown) with each channel's inductive device comprised of a transformer and a common mode choke arranged in series with respect to one another. While the common mode choke and transformer arrangement shown is exemplary, it is appreciated that these inductive devices may generally include any type of inductive devices including, without limitation, inductors, transformers and common mode chokes. Each of these inductive devices 420 is wound with a conductive wire of the type known in the art such that the conductive winding will have wire leads 440 extending from the inductive devices.

Figure 4B:
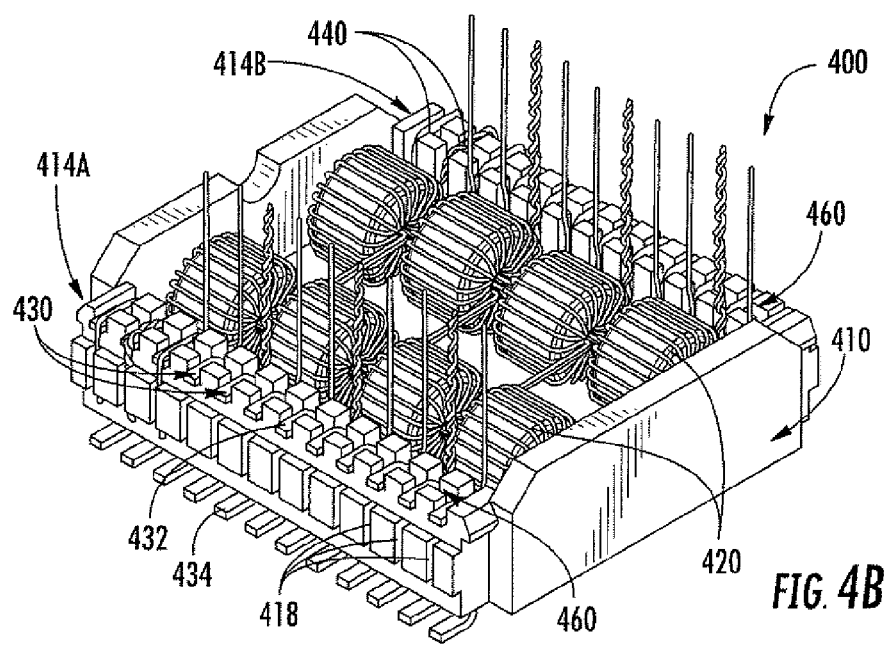
FIG. 4B is a perspective view of the exemplary open header electronics apparatus of FIG. 4A, illustrating the routing of wires onto the lead-frame in accordance with the principles of the present disclosure.
Figure 4C:
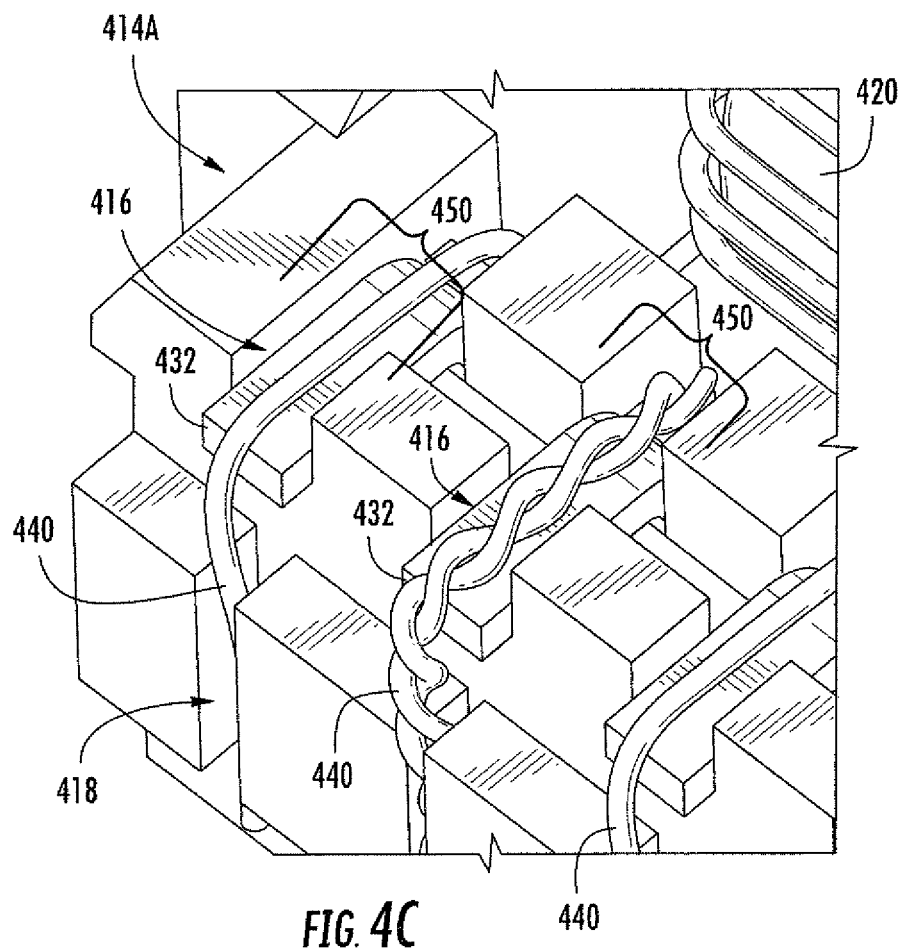
FIG. 4C is a detail view of a portion of the open header electronics apparatus of FIG. 4A detailing the routing of wires onto the lead-frame in accordance with the principles of the present disclosure.

Referring now to FIGS. 4B and 4C, the arrangement of the wire wound terminations is shown and described in detail. FIG. 4B generally depicts open header electronic apparatus 400 comprised of a header assembly 410 that includes terminal pins 430 that are received within terminal pin notches 416 of sidewalls 414A and 414B. Wire leads 440 from the wirewound inductive devices 420 are received and routed within channels 450. In the illustrated embodiment of FIG. 4A, sidewalls 414A and 414B of header assembly 410 include terminal pin notches 416 formed therein. Sidewalls 414A and 414B may be configured to have either: (1) angled; or (2) straight walls (as shown). Sidewalls 414A and 414B can have any suitable number of terminal pin notches 416 formed therein, including anywhere from a single notch to several dozen notches or more. Terminal pin notches 416 can also be configured so as to possess any suitable size and shape. In the illustrated embodiment, terminal pin notches are sized so as to have a width that is approximately equal to the width of the terminal portion (FIG. 4C, 432) of the terminal pins. While, the terminal pin notches 416 are illustrated as having an equal pitch (i.e. the distance from terminal pin to terminal pin), it is appreciated that these terminal pin notches can be disposed at varying distances from another so as to include, for example, staggered rows from one sidewall to the other, or one or more parallel rows with varying pitch distances. Sidewalls 414A and 414B are also be configured to have one or more conduits 460 running orthogonal to the terminal pin notches 416.

The illustrated terminal pins 430 are insert-molded within sidewalls 414A and 414B during fabrication; however, these terminals pins may be alternatively inserted or otherwise installed after fabrication. Terminal pins 430 are configured to have a terminal portion 432 that is received within the terminal pin notches 416 thereby forming one or more wire routing channels 450. Terminal pins 430 are also configured to have an external interface portion (FIG. 413, 434) extending from a bottom portion of the sidewalls 414A and 414B. In the illustrated embodiment, these external interface portions are adapted for interfacing with contact pads via a surface mount connection; although it is appreciated that these external interface portions can also be configured for through-hole mounting or other mounting techniques such as via a ball grid array ("BGA"), etc.

Wire leads 440, as shown in the exemplary embodiment, are received and routed through mounting channels 450, and optionally received in secondary mounting channels 418 that are configured to secure the wire leads 440 prior to termination to the terminal portion 432 of the terminal pins 430. For example, the wire leads 440 may be received in the secondary mounting channels 418 and temporarily secured via the use of a masking tape or the like. The wire leads 440, running through mounting channels 450, are next electrically coupled to the terminal portion 432 of terminal pins 430 via wellknown solder connection techniques including, for example, hand soldering, solder dipping, resistance welding and the like to the terminal portion 432.

Open Header Electronics Apparatus—Alternative Embodiment

Figure 5B:
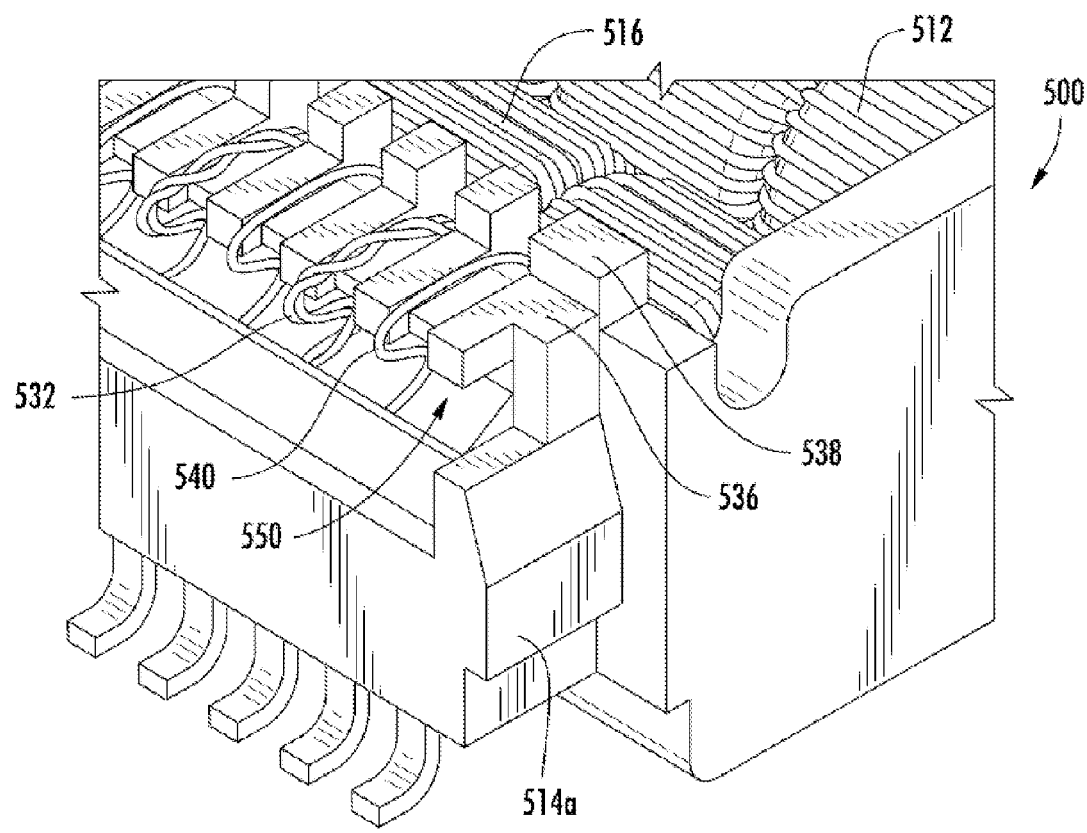
FIG. 5B is a detail view of a portion of the open header electronics apparatus of FIG. 5A detailing the routing of wires onto the lead-frame in accordance with the principles of the present disclosure.

Referring now to FIGS. 5A-5B, an alternative embodiment for an open header electronic apparatus 500 for mounting onto the surface of a printed circuit board (not shown) is illustrated. The open header electronic apparatus 500 comprises a header assembly 510 having an open cavity 512, sidewalls 514A and 514B, wire routing cavities 516, and inductive devices 520 having wire leads 540 extending therefrom. In the illustrated embodiment, the header assembly includes an open cavity 512 which can be optionally encapsulated with, for example, a thermoset epoxy resin, siliconebased fillers, and/or other suitable encapsulants. While the illustrated header assembly 510 is shown with an open top (similar to the embodiment previously discussed with respect to FIGS. 4A-4C), it is envisioned that in certain embodiments it would be desirable for the open header electronic apparatus 500 to include a top cover (not shown) that would snap onto or otherwise completely or partially seal the open cavity 512 of the header assembly such that the electronic apparatus 500 is no longer considered "open". For example, in some embodiments, it would be desirable to include a top cover if the underlying inductive devices are electrically sensitive to being encapsulated with an epoxy resin or other filler material. Furthermore, one wall of the header assembly 510 is illustrated as including an orientation notch 518 positioned such that the desired alignment of the open header electronic apparatus with respect to the printed circuit board upon which the open header electronic apparatus will be mounted can be readily discerned.

The two sidewalls 514A and 514B of the header assembly 510 also include insert molded terminal pins 530. In the illustrated embodiment, the insert molded terminal pins 530 comprise surface mountable terminals that possess a general "C-shaped" profile, although it is appreciated that other terminal types and shapes could be readily substituted (e.g., through-hole terminals, gull-wing terminals, etc.). Another salient advantage of the illustrated configuration for the surface mountable terminals 530 is that these terminals egress for a prescribed distance (e.g., 0.030 inches) prior to being formed at a ninety degree)(90° angle. By egressing for a prescribed distance prior to being formed, the coplanarity of the underlying terminal pins 530 can more readily be adjusted to within a prescribed tolerance (e.g., 0.004 inches). In one exemplary embodiment, the terminal pins are manufactured from a copper or copper-based alloy that is over-plated with nickel and tin. While the use of copper or copper-based alloys is exemplary, it is appreciated that other conductive alloys (such as Alloy 42) could be readily substituted if desired. In addition, while the use of nickel and tin plating is exemplary due to recent pushes for lead-free ("Pb-free") terminals, it is also appreciated that many other suitable plating materials (including Pb-based plating) could also be readily substituted.

The cavity 512 of the header 510 is sized appropriately to accommodate a plurality of wire-wound inductive devices 520. Similar to the embodiment illustrated in FIGS. 4A-4C, these inductive devices 520 are optionally arranged into channels (here an eight-channel device is shown) with each channel's inductive device comprised of a transformer and a common mode choke arranged in series with respect to one another. While the common mode choke and transformer arrangement shown is exemplary, it is appreciated that these inductive devices may generally include any type of inductive devices including, without limitation, inductors, transformers and common mode chokes. Each of these inductive devices 520 is wound with a conductive wire of the type known in the art such that the conductive winding will have wire leads 540 extending from the inductive devices.

Referring now to FIG. 5B, the wire leads 540 of the inductive devices 520 are routed from the cavity 512 through the wire-routing cavities 516 of sidewalls 514A and 514B and onto the ends of the terminal pins 532. The wire leads 540 are then optionally routed underneath the terminal pin ledge 550 where they are subsequently trimmed. By including the terminal pin ledge 550, the resultant memory of the wires 540 as they are inserted underneath this terminal pin ledge 550 helps to maintain the positioning of the wires until termination with, for example, a eutectic solder. While the terminal pin ledge 550 is illustrated as a single continuous ledge, it is appreciated that the terminal pin ledge 550 may alternatively be segmented so as to further obviate, inter alia, solder bridging between adjacent terminals 532.

In the illustrated embodiment, the wire-routing cavities 516 are sized so as to have a width that is approximately equal to the width of the terminal pins 532. While, the wire-routing cavities 516 are illustrated as having an equal pitch (i.e. the distance from terminal pin to terminal pin), it is appreciated that these terminal pin notches can be disposed at varying distances from one another so as to include, for example, staggered rows from one sidewall to the other, or one or more parallel rows with varying pitch distances. The wire leads 540, running through each of the wire-routing cavities 516, are next electrically coupled to the terminal portion 532 of terminal pins 530 via well-known solder connection techniques including, for example, hand soldering, solder dipping, resistance welding and the like to the terminal portion 532 of the terminal pins.

Another salient advantage of the configuration illustrated in FIG. 5B is that the thickness of the adjacent wall structure 536, 538 to the terminal pins 532 varies as a function of distance from the internal cavity 512. The interior wall structure 538 has a thicker wall structure than that of the exterior wall structure 536. The thicker wall structure of the interior wall 538 is useful in, for example, mass termination operations (e.g. solder dipping) by reducing the amount of burn back on the insulation that covers the wires 540. Furthermore, exterior wall structure 536 has a thinner wall structure which is useful in preventing solder bridging between adjacent terminal pins 532 as well as eliminating the appearance of cold solder joints at the soldered connections. For example, if the height of the exterior wall structure 536 is too low, solder bridging between adjacent terminal pins 532 can be problematic. Conversely, if the height of the exterior wall structure 536 is too tall, cold solder joints can occur when attempting to bond the wires to the terminals 532 during mass termination soldering operations.

The illustrated terminal pins 530 are insert-molded within sidewalls 514A and 514B during fabrication; however, these terminals pins may alternatively be inserted or otherwise installed after fabrication. Terminal pins 530 are configured to have a terminal portion 532 that is received within the terminal pin notches 516 thereby forming one or more wire routing channels. Terminal pins 530 are also configured to have an external interface portion extending from a bottom portion of the sidewalls 514A and 514B. In the illustrated embodiment, these external interface portions are adapted for interfacing with contact pads via a surface mount connection; although (and as was previously discussed supra) it is appreciated that these external interface portions can also be configured for through-hole mounting or other mounting techniques such as via a ball grid array ("BGA"), etc.

Connector Insert Assembly—Alternative Embodiments

Referring now to FIGS. 6A-6E, exemplary configurations of an alternative connector insert assembly 600 is shown and described in detail. The connector insert assembly shown in FIGS. 6A-6E is configured to be received within the connector housing 302 of a connector assembly 300 as shown in, for example, FIG. 3. The general use of connector insert assemblies within a single or multi-port connector assembly is known and is described in, for example, co-owned U.S. Pat. No. 7,241,181 filed Jun. 28, 2005 and entitled "Universal Connector Assembly and Method of Manufacturing", the contents of which were previously incorporated herein by reference in its entirety, although it will be appreciated that this configuration is merely exemplary, and others may readily be used consistent with the disclosure.

Referring now to FIG. 6A, the illustrated insert body assembly 601 consists of a single insert body element generally made from a high-temperature polymer (e.g., a liquid crystal polymer (LCP)) and preferably formed by an injection molding process. The insert body assembly of FIG. 6A differs from that shown in FIG. 1, as the insert body assembly of FIG. 1 is for use with one or more chip choke assemblies while the embodiment shown in FIG. 6A is configured specifically for use with wound toroidal cores 625. However, it is envisioned that the shape of the insert body assembly of FIG. 6A can be readily adapted to accommodate the chip choke assemblies illustrated in FIG. 1 if desired.

The insert body assembly includes an electronic component cavity 628 that is configured to receive any number of electronic components, including the aforementioned torpid wire wound electronic components. Although not illustrated with features that conform to the inserted electronic components, the cavity can incorporate toroidal molded shapes so as aid in the positioning of the coils within the electronic component receiving cavity in an alternative embodiment. The use of electronic component receiving cavities which are shaped to accommodate the electronic components received therein are described in co-owned U.S. Pat. No. 5,015,981 issued on May 14, 1991 and entitled "Electronic Microminiature Packaging and Method", the contents of which are incorporated herein by reference in its entirety. On the top and bottom surface of the illustrated embodiment of the insert body assembly 601 are substrate positioning posts 603 and 602, respectively. The bottom substrate positioning posts 602 are formed from the underlying injection molded polymer, while the upper substrate positioning posts 603 are made from a conductive metal terminal that is either post-inserted or insert molded into the underlying insert body assembly. However, it is appreciated that the use of material for the substrate positioning posts may be readily varied depending upon the particular needs of the underlying design.

Figure 6B:
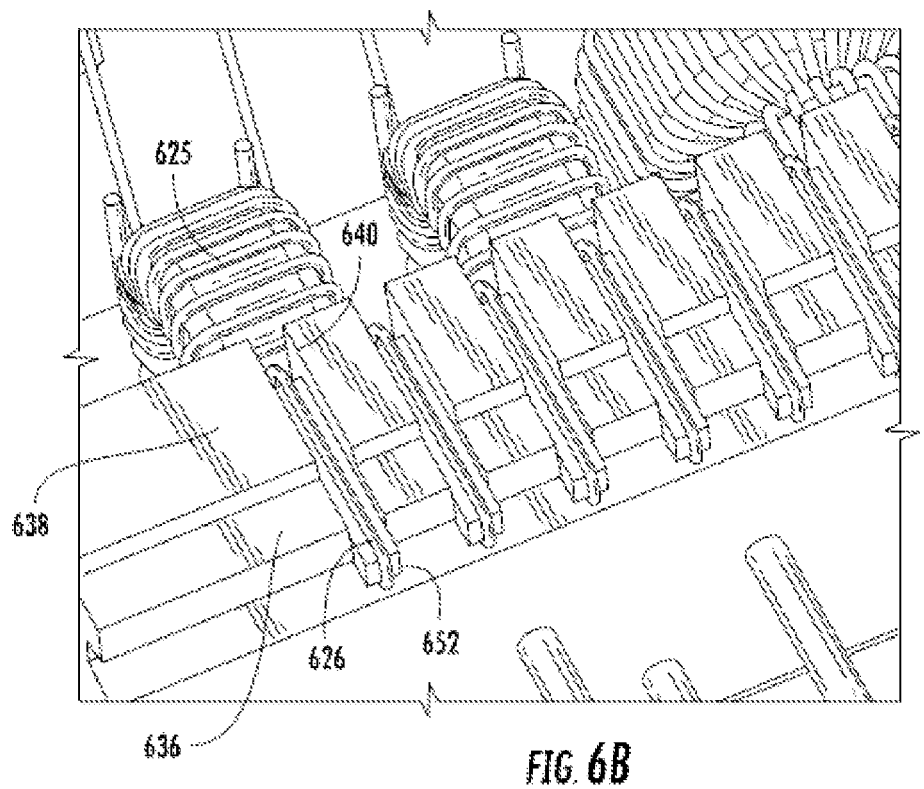
FIG. 6B is a detail view of a portion of the connector insert assembly of FIG. 6A according to the principles of the present disclosure.
Figure 6C:
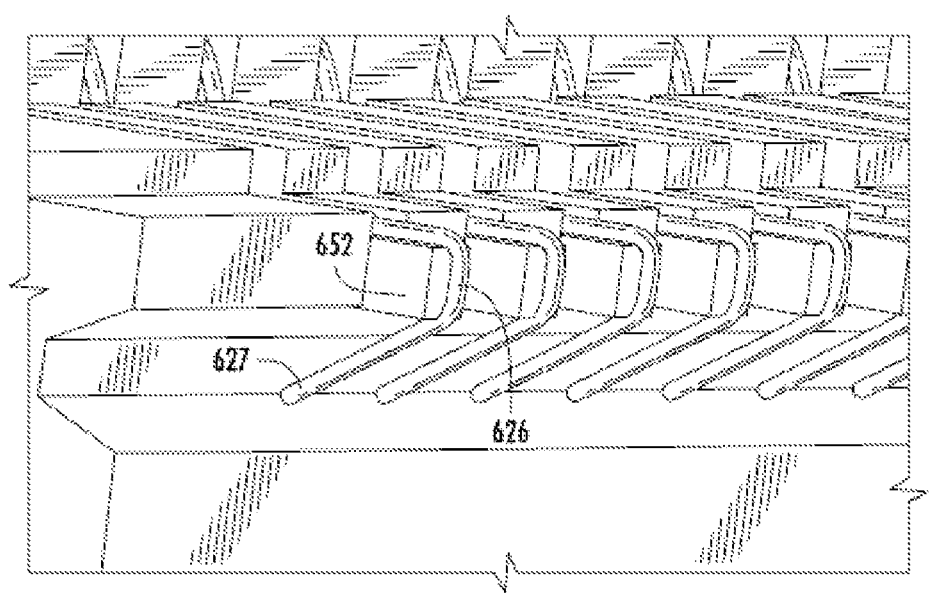
FIG. 6C is yet another detail view of a portion of the connector insert assembly of FIG. 6A according to the principles of the present disclosure.

Referring now to FIGS. 6B-6C, the exemplary wire termination feature of the present embodiment is shown and described in detail. FIG. 6B illustrates a detailed view of the termination slots 640 present on the side surface of the insert body assembly with wire ends 626 from a wound electronic component 625 disposed therein. The wire ends 626 are routed around the end of a conductive terminal 652 that is also located within the termination slot. Accordingly, the insert body assembly illustrated in FIGS. 6A-6E does not rely on wrapping of the wire onto conductive terminals thereby creating a direct connection between the wire ends of the wound electronic component and the conductive terminals. Furthermore, wound electronic components that include center taps (as is common in, for example, many Gigabit Ethernet applications) can also have these center taps connected directly to the conductive terminals rather than within the cavity of the insert body assembly. Accordingly, solder bridge issues which can be seen in, for example, wire wrapped terminals are effectively eliminated.

Another salient advantage of the configuration illustrated in FIG. 6B is that the thickness of the adjacent wall structure 636, 638 to the terminal pins 652 varies as a function of distance from the internal cavity 628. The interior wall structure 638 has a thicker wall structure than that of the exterior wall structure 636. The thicker wall structure of the interior wall 638 is useful in, for example, mass termination operations (e.g. solder dipping) by reducing the amount of burn back on the insulation that covers the wires 626. Furthermore, exterior wall structure 636 has a thinner wall structure which is useful in preventing solder bridging between adjacent terminal pins 652 as well as preventing cold solder joints during mass termination soldering operations. For example, if the height of the exterior wall structure 636 is too low, solder bridging between adjacent terminal pins 652 can be problematic. Conversely, if the height of the exterior wall structure 636 is too tail, cold solder joints can occur when attempting to bond the wires 626 to the terminals 652.

As shown in FIG. 6C, the wire ends are optionally positioned about the end of the conductive terminal and into the termination cavity 627 and temporarily secured to the body of the insert body assembly using, for example, a termination apparatus, clamp, tape or various known adhesive methods. By including the terminal cavity 627, the resultant memory of the wires 626 as they are inserted into this terminal cavity 627 helps to maintain the positioning of the wires until they are terminated with, for example, a eutectic solder to the terminal pins. While the terminal cavity 627 is illustrated as a single continuous cavity, it is appreciated that the terminal cavity 627 may alternatively be segmented so as to mitigate, inter alia, solder bridging between adjacent terminals 652. The exemplary slotted termination method illustrated in FIGS. 6B-6C is advantageous over prior art methods, in that the insert body assembly 601 is less costly to manufacture. For example, such a configuration requires less manufacturing labor to produce (along with the resultant costs associated with this manufacturing labor) due to the fact that it eliminates the wire wrapping methodologies required in the prior art. Prior to inserting the wire ends 626 within these termination slots, in an exemplary embodiment, the wire insulation can be selectively removed through any number of processes such as mechanical, precision laser, heat and/or as part of a solder dip or solder wave process. The removal of the insulation can be accomplished using any number of known insulation removal techniques including for instance via laser ablation after assembly, a solder dip of the termination ends prior to assembly or by a solder dipping process which removes the insulation during termination of the wire ends to each of the substrates. Alternatively, the wire insulation can be removed from the wire ends during attachment of the wire ends 626 to the substrate(s) (see e.g., FIG. 6E).

Figure 6D:
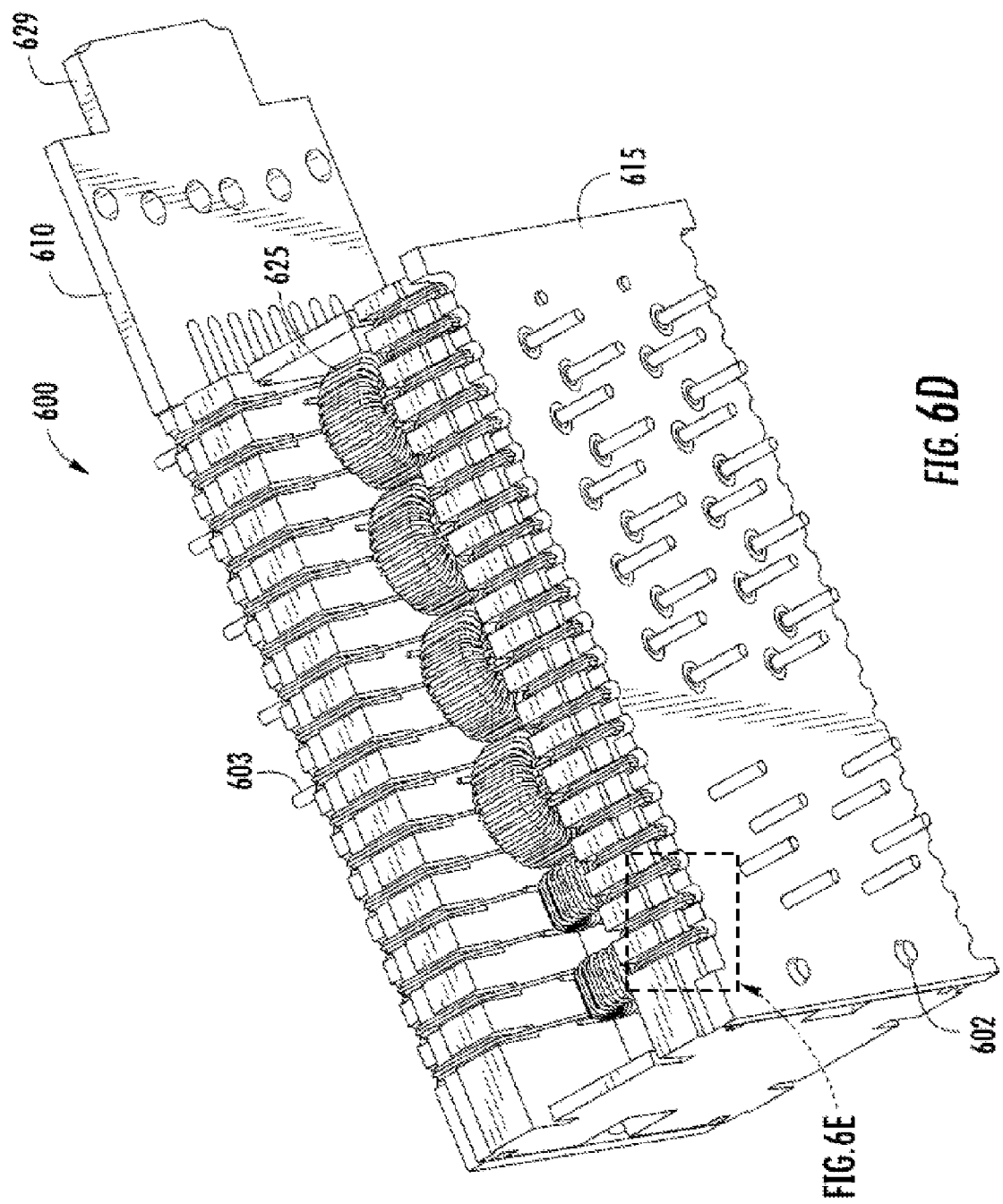
FIG. 6D is a perspective view of the connector insert assembly of FIG. 6A with the top and bottom substrates disposed thereon.

Referring now to FIG. 6D, the upper 610 and lower substrates 615 are shown in combination with the connector insert assembly 600. The resultant connector insert assembly overall dimensions are similar in size to that illustrated in FIG. 1 and accordingly, can readily be accommodated in the connector assembly illustrated in FIG. 3. It will be appreciated that the terms "upper" and "lower" as used herein are meant in a completely relative sense, and are not in any way limiting or indicative of any preferred orientation. For example, where the connector insert assembly is installed on the underside of a substantially horizontal motherboard, the "upper" terminals would actually be disposed below the "lower" terminals. The upper and lower substrates are, in an exemplary embodiment, secured to the insert body assembly via an interference fit between posts 602 located on the insert body assembly and holes contained within the lower substrate 615. As an alternative, or in addition to the interference fit posts, solderable terminals 603 are inserted into the insert body assembly and the upper substrate is subsequently soldered to these solderable terminals. In one exemplary implementation, these solderable terminals are made of copper and are insert-molded into the underlying insert body assembly. Positioned onto the upper substrate at a front portion 629 thereof is a terminal insert assembly similar to that shown with respect to FIG. 1 (i.e., item 129, FIG. 1) comprised of an upper terminal insert assembly and lower terminal insert assembly. The mounting of the terminal insert assemblies to the upper substrate is described in, for example, co-owned U.S. Pat. No. 7,241,181 filed Jun. 28, 2005 and entitled "Universal Connector Assembly and Method of Manufacturing", the contents of which were previously incorporated by reference in its entirety.

Figure 6E:
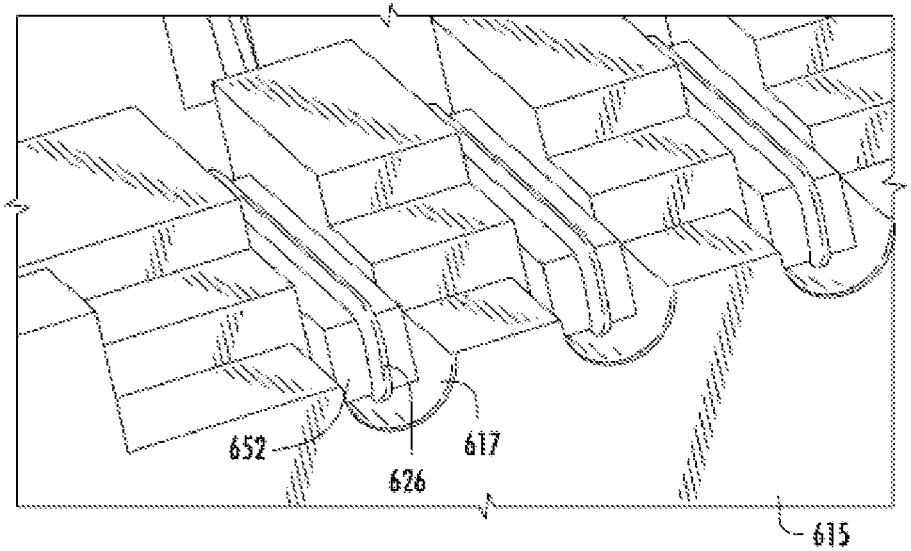
FIG. 6E is a detail view of a portion of the connector insert assembly of FIG. 6D illustrating the termination of the wire wound components to the printed circuit board according to the principles of the present disclosure.

Referring now to FIG. 6E, the termination of the wire terminated conductive terminal pins 652 to the lower substrate 615 is shown in detail. Similar terminations are made to the upper substrate as well. The lower substrate includes a plurality of half-moon shaped via holes 617 that are sized to accommodate the wire terminated conductive terminals pins. The lower substrate is placed onto the insert body element such that the half-moon shaped via holes are aligned with and match up with respective termination slots. In one exemplary implementation, the substrate is screen printed with a eutectic solder paste. The substrate is then mechanically secured to the insert body elements with the wire ends of the wound electronic components positioned within the termination slots and adjacent to the screen printed substrate(s). The screen printed solder paste is then heated (e.g., in a solder reflow oven) and the screen printed solder paste melts and bonds with the underlying wire ends thereby securing the wire ends from the wire wound electronic components to the substrate. In an alternative embodiment, the substrate is not screen printed with a solder paste; rather the substrate is merely mechanically positioned over the termination slots as shown in FIG. 6E. The substrate acts to fix the wire ends within the termination slots. The resultant assembly is subsequently mass terminated, such as via a wave soldering or a selective solder fountain methodology. In yet another alternative embodiment, the wire termination solder operation may utilize one or more industry standard manual processing practices such as via the use of a heated iron solder, laser solder, etc.

Figure 7:
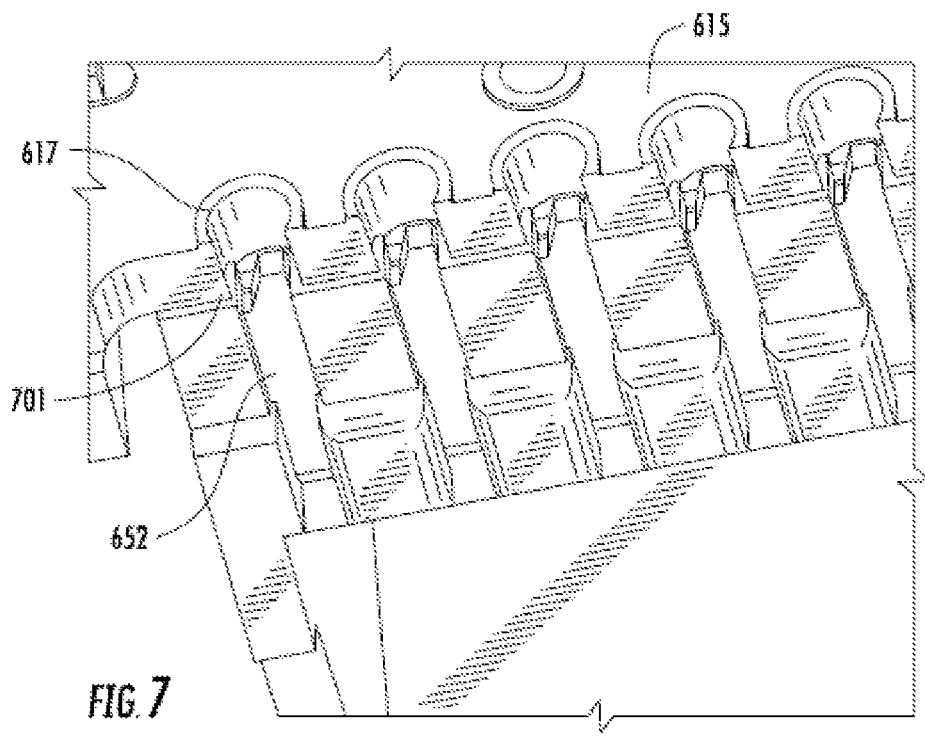
FIG. 7 is a detail view illustrating an alternative implementation of the termination of the wire wound components for the connector insert assembly of FIG. 6A to the printed circuit board according to the principles of the present disclosure.

Referring now to FIG. 7, an alternative terminal shape for the wire terminated conductive terminal pins 652 for, for example FIG. 6E, is shown in detail. As is present in the embodiment described previously with regards to FIG. 6E, the lower substrate includes a plurality of half-moon shaped via holes 617 that are sized to accommodate the wire terminated conductive terminals pins. The lower substrate is again placed onto the insert body element such that the half-moon shaped via holes are aligned with and match up with respective termination slots. However, in the illustrated embodiment of FIG. 7, the terminal pins 652 include a notch 701 that is configured to maintain wire leads (not shown) from the wire-wound components at a more accurate prescribed distance from one another. In other words, the wire leads from the electronic components can now be positioned not only over the terminal pins 652 but over a prescribed portion (e.g., off to one side) of the terminal pins 652. The termination of the wire leads to the printed circuit board 615 is otherwise as described above with respect to FIG. 6E. For example, in one exemplary implementation, the substrate is screen printed with a eutectic solder paste. The substrate is then mechanically secured to the insert body elements with the wire ends of the wound electronic components positioned within the termination slots and adjacent to the screen printed substrate(s). The screen printed solder paste is then heated (e.g., in a solder reflow oven) and the screen printed solder paste melts and bonds with the underlying wire ends thereby securing the wire ends from the wire wound electronic components to the substrate. In an alternative embodiment, the substrate is not screen printed with a solder paste; rather the substrate is merely mechanically positioned over the termination slots as shown in FIG. 7. The substrate acts to fix the wire ends within the termination slots. The resultant assembly is subsequently mass terminated, such as via a wave soldering or a selective solder fountain methodology. In yet another alternative embodiment, the wire termination solder operation may utilize one or more industry standard manual processing practices such as via the use of a heated iron solder, laser solder, etc. Similar terminations are made to the upper substrate (not shown) as well.

Methods of Manufacture

Figure 8:
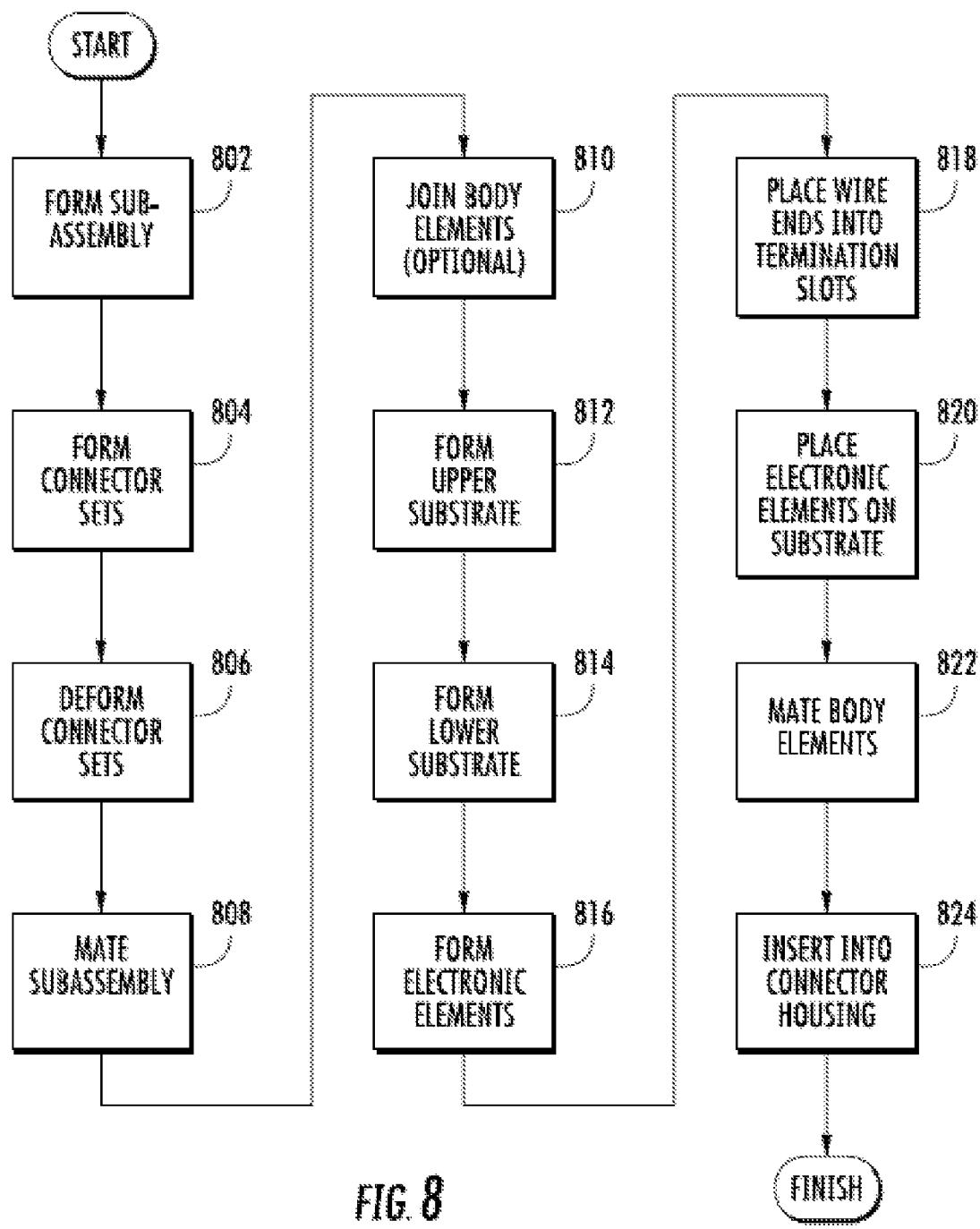
FIG. 8 is a logical flow diagram illustrating one exemplary embodiment of a method of manufacturing the connector assembly of FIGS. 1-3E and 6A-7 in accordance with the principles of the present disclosure.

Referring now to FIG. 8, an exemplary embodiment of the method 800 of manufacturing, for example, the aforementioned connector assembly 300 for use with any of the connector insert assemblies 100, 200, 600 illustrated with respect to FIGS. 1-1F, 2A-2E, and 6A-7 is shown and described in detail.

In the embodiment of FIG. 8, the method 800 generally comprises first forming the subassembly 101, 201, 601 in step 802. The insert body assembly 101, 201, 601 is preferably formed using an injection molding process of the type well known in the art, although other processes may be used. The exemplary injection molding process is chosen for its ability to accurately replicate small details of the mold, its low cost, and for its well-known ease of processing.

Next, one or more conductor sets (120a, 120b) are provided in step 804. As previously described, the conductor sets comprise metallic (e.g., copper or copper alloy) leadframes having a substantially square or rectangular cross-section and sized to fit within the slots of the connectors in the housing.

In step 806, the conductors are partitioned into sets; a first set 120a for use with a first connector recess of a port-pair (i.e., within the housing 302, and mating with the modular plug terminals), and a second set 120b for the other port in the port-pair. The conductors are formed to the desired shape(s) using a forming die or machine of the type well known in the art. Specifically, for the embodiment of FIG. 1, the first and second conductor sets 120a, 120b is deformed so as to produce the juxtaposed, substantially coplanar configuration.

In step 808, the first and second conductor sets 120a, 120b are insert-molded within the respective portions of the terminal insert assembly 129, thereby forming the terminal insert assemblies shown in, for example, FIG. 1 which was described in detail supra. Further, the two sub-components of the insert 129 are mated to the upper substrate 110, such as via a snap-fit, friction, an epoxy adhesive, thermal bonding, etc.

In step 810, the first and second insert body elements 102 of the connector insert assembly 101 (or single body element 601 of the connector insert assembly 600 shown in FIG. 6A) is formed via injection or transfer molding are bonded together. In one embodiment, a high-temperature polymer of the type ubiquitous in the art is used to form the insert body elements 102 although this is not required, and other materials (even non-polymers) may be used.

Per step 812, the upper substrate 110, 210, 610 is formed and perforated through its thickness with a number of apertures of predetermined size. Methods for forming substrates are well known in the electronic arts, and accordingly are not described further herein. Any conductive traces on the substrate required by the particular design are also added, such that necessary ones of the conductors, when received within the apertures, are in electrical communication with the traces.

Per step 814, the lower substrate 115, 215, 615 is formed and is perforated through its thickness with a number of apertures of predetermined size. Alternatively, the apertures may be formed at the time of formation of the substrate itself.

In step 816, one or more electronic components, such as the aforementioned toroidal transformers and chokes, chip chokes and other surface mount devices, are next formed and prepared (if used in the design). The manufacture and preparation of such electronic components is well known in the art, and accordingly is not described further herein.

In step 818, the wire wound ends of the wire wound electronic components formed in step 816 are inserted into the termination slots of the insert body element(s) where they are captured, for example, between the openings of upper substrate and aforementioned grooves. The same process may optionally be repeated for the lower substrate.

The relevant electronic components are then optionally mated to the upper substrate 110, 210, 610 in step 820. In one embodiment, one or more surface mount components are first positioned on the upper substrate, and the magnetics (e.g., toroids) positioned thereafter within the cavity of the insert body elements, although other sequences may be used. The components are electrically coupled to the PCB using a eutectic solder re-flow process as is well known in the art. In step 820, the remaining electrical components are disposed within the cavity of the insert body assembly 101, 201, 601 and wired electrically to the appropriate ones of the upper and/or lower termination slots.

In step 822, the assembled upper and lower substrates with optional surface mount electronic components are then mated with the terminal insert assembly, specifically such that the upper terminals 120a and lower terminals 120b are disposed in their corresponding desired position with respect to the upper substrate 110, 210, 610. The terminal assemblies 129 are then bonded to the substrate contacts via soldering or welding to ensure a rigid electrical connection for each terminal assembly to conductive pathways located on the substrate.

The completed insert connector assembly may be electrically tested to ensure proper operation if desired.

In step 824, the completed insert connector assembly is inserted into a connector housing via the use of a snap fit and the like. The connector housing is then surrounded with an EMI shield if desired, thereby forming the completed connector assembly.

With respect to the other embodiments described herein, the foregoing method may be modified as necessary to accommodate the additional components. Such modifications and alterations will be readily apparent to those of ordinary skill, given the disclosure provided herein.

Figure 9:
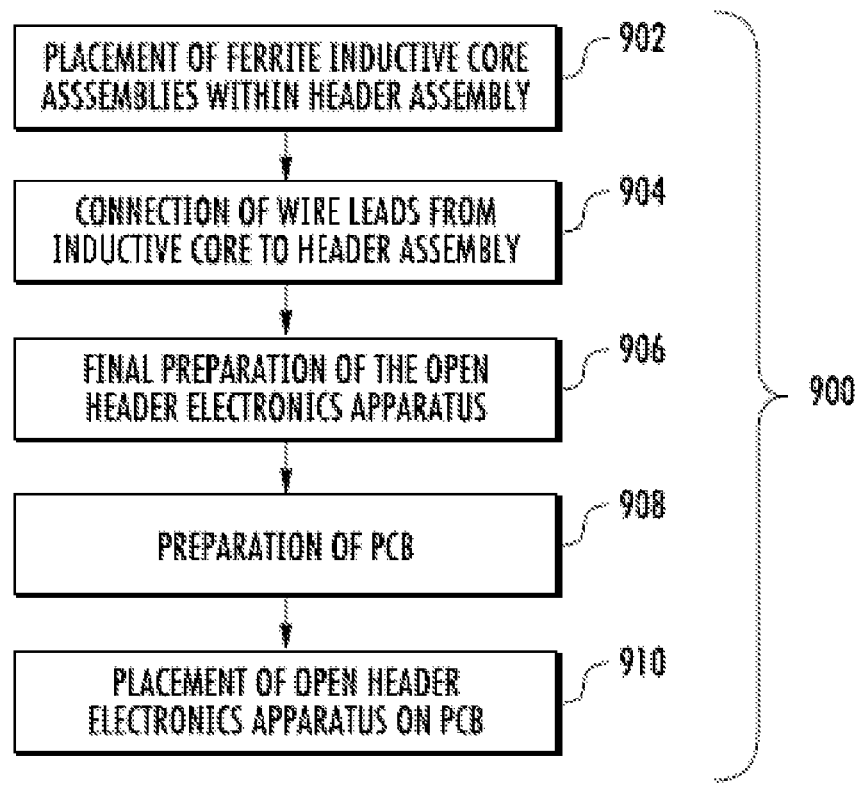
FIG. 9 is logical flow diagram illustrating one exemplary embodiment of the method of manufacturing the open header electronics apparatus of FIGS. 4A-4C and 5A-5B in accordance with the principles of the present disclosure.

Referring now to FIG. 9, an exemplary method of manufacturing 900 the open header electronic apparatus 400, 500 of, for example, FIGS. 4A-4C and 5A-5B is shown and described in detail.

At step 902, the ferrite cores are wound with wire and placed within the cavity of the header assembly. In an exemplary embodiment, the header assembly will maintain a fixed distance between the adjacent side walls of the header assembly and the cores so as to accommodate thermal expansion during subsequent soldering operations. The use of spacing to accommodate, inter alia, thermal expansion of the ferrite cores is disclosed in co-owned and co-pending U.S. patent application Ser. No. 12/876,003 filed Sep. 3, 2010 and entitled "Substrate Inductive Devices and Methods", the contents of which were previously incorporated herein by reference in its entirety.

At step 904, the conductive wire leads that electrically join the header assembly and the magnetically permeable cores are placed within their respective wire routing channels and soldered or welded to the header assembly terminals. In one exemplary embodiment, the wire ends from the magnetically permeable cores are routed through the wire routing channels and secured within the secondary mounting channels using a masking tape. The wire ends of the conductive wire leads are then secured to the terminal portions of the terminals via hand soldering, solder dipping, resistance welding or any other known method for securing the wire ends to the terminals.

In one embodiment, and at step 906, the header assembly is optionally encapsulated or backfilled with, for example, a thermoset epoxy resin, a silicone based encapsulant, or other suitable filler materials or constituents to seal and protect the wound toroids. Alternatively, the header assembly is constructed from two separate pieces, including the header assembly and a cover, such that the header assembly cavity is covered by the aforementioned cover.

At step 908, the printed circuit board (PCB) upon which the open header electronic apparatus is to be mounted is prepared. In one embodiment, the PCB will contain a number of surface mountable pads that are prepared via the application of a eutectic solder paste. Alternatively, if the PCB is intended for use with a through hole termination, the PCB is drilled and plated through holes are applied to the PCB.

At step 910, the open header electronic apparatus is placed onto the printed circuit board. In surface mount embodiments, the open header electronic apparatus is placed onto the PCB using well known pick and place equipment. The open header electronic apparatus is then soldered to the PCB using well-known automated processes such as IR reflow, or alternatively by hand soldering the open header electronic apparatus to the printed circuit board. In an alternative embodiment, where the open header electronic apparatus comprises a through hole termination, the terminals of the open header electronic apparatus are inserted into the plated through holes located on the printed circuit board and secured to the printed circuit board using known processing techniques such as a wave soldering process, or hand soldering.

It will be recognized that while certain aspects of the present disclosure are described in terms of specific design examples, these descriptions are only illustrative of the broader methods of the disclosure, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A connector assembly comprising:
   a connector housing comprising a recess configured to receive at least a portion of a modular plug having a plurality of conductors disposed thereon;
   a plurality of sets of conductors disposed at least partly within the recess and configured to interface electrically with respective ones of the plurality of modular plug conductors; and
   an insert structure comprising a plurality of termination grooves having respective conductive ends of one or more wire wound electronic components disposed substantially in the plurality of termination grooves, the conductive ends being held within at least a portion of the termination grooves via a termination technique;
   wherein at least a portion of the plurality of sets of conductors are in signal communication with the one or more wire wound electronic components;
   wherein at least one conductive end of the one or more wire wound electronic components is disposed around an end of a conductive terminal disposed at least partly within a respective one of the plurality of termination grooves; and
   wherein at least a portion of the plurality of termination grooves comprises an interior wall structure and an exterior wall structure, the interior wall structure having a thickness that is greater than a thickness of the exterior wall structure.

2. The connector assembly of claim 1, further comprising a ledge feature proximate to the at least a portion of the plurality of termination grooves, the ledge feature being configured to maintain a position of the at least one conductive end of the one or more wire wound electronic components.

3. The connector assembly of claim 1, wherein an end of the conductive terminal comprises a notch feature, the at least one conductive end of the one or more wire wound electronic components being disposed within the notch feature.

4. The connector assembly of claim 3, wherein the notch feature is configured to position a first one of the at least one conductive end of the one or more wire wound electronic components at a predetermined distance from a second one of the at least one conductive end.

5. The connector assembly of claim 1, wherein the at least one conductive end of the one or more wire wound electronic components is disposed within a termination cavity and disposed between the conductive terminal and a substrate.

6. The connector assembly of claim 5, wherein the substrate comprises at least one half-moon shaped via disposed on an edge of the substrate, a respective one of the at least one half-moon shaped via being configured to receive at least a portion of the at least one conductive end of the one or more wire wound electronic components.

7. An electronic apparatus, comprising:
a body portion comprising an electronic component receiving cavity and a plurality of conductive terminals; and
a plurality of wire-wound electronic components;
wherein:
 the body portion further comprises:
  a plurality of wire-routing cavities, the plurality of wire-routing cavities having at least a portion of the plurality of conductive terminals disposed therein; and
  a terminal pin ledge that is disposed beneath the at least portion of the plurality of conductive terminals;
 the plurality of wire-routing cavities each comprises a width approximately equal to a width associated with the plurality of conductive terminals; and
 a plurality of wire ends associated with the wire-wound electronic components are configured to be routed into respective ones of the plurality of wire-routing cavities and routed about an end of respective ones of the plurality of conductive terminals and into the terminal pin ledge.

8. The electronic apparatus of claim 7, wherein at least one of the wire-routing cavities has a pair of adjacent wall structures disposed adjacent thereto.

9. The electronic apparatus of claim 7, wherein each of the plurality of wire-wound electronic components comprises an inductive device.

10. The electronic apparatus of claim 7, wherein the plurality of wire ends associated with the wire-wound electronic components comprise a center tap.

11. The electronic apparatus of claim 7, wherein the electronic apparatus is configured to be mounted onto a printed circuit board.

12. The electronic apparatus of claim 11, wherein the body portion comprises an orientation notch configured to facilitate a desired alignment of the electronic apparatus with the printed circuit board.

13. The electronic apparatus of claim 12, wherein the body portion further comprises one or more side walls, the one or more side walls comprising the terminal pin ledge, the terminal pin ledge being configured to mount onto the printed circuit board.

14. An electronic apparatus, comprising:
a body portion comprising an electronic component receiving cavity and a plurality of conductive terminals; and
a plurality of wire-wound electronic components;
wherein the body portion comprises a plurality of wire-routing cavities, the plurality of wire-routing cavities having at least a portion of the plurality of conductive terminals disposed therein;
wherein a plurality of wire ends associated with the plurality of wire-wound electronic components are routed into respective ones of the plurality of wire-routing cavities, at least one of the plurality of wire-routing cavities having a pair of adjacent wall structures disposed adjacent thereto; and
wherein the pair of adjacent wall structures comprise an interior wall portion and an exterior wall portion, the interior wall portion having a thickness greater than the exterior wall portion.

15. The electronic apparatus of claim 14, wherein the plurality of wire ends associated with the plurality of wire-wound electronic components are routed about an end of respective ones of the plurality of conductive terminals.

16. The electronic apparatus of claim 14, wherein the body portion further comprises a terminal pin ledge disposed beneath the at least portion of the plurality of conductive terminals.

17. The electronic apparatus of claim 14, wherein an end of each of the plurality of conductive terminals comprises a notch feature, respective ones of the plurality of wire ends associated with the plurality of wire-wound electronic components being disposed within the notch feature.

18. The electronic apparatus of claim 14, wherein the interior wall portion is configured to prevent burn back associated with the plurality of wire ends associated with the plurality of wire-wound electronic components during a mass termination operation.

19. The electronic apparatus of claim 18, wherein the exterior wall portion is configured to prevent solder bridging between adjacently disposed ones of the plurality of conductive terminals.

* * * * *